US011671489B2

(12) United States Patent
Thyagarajan et al.

(10) Patent No.: US 11,671,489 B2
(45) Date of Patent: Jun. 6, 2023

(54) HIGH AVAILABILITY AND HIGH UTILIZATION CLOUD DATA CENTER ARCHITECTURE FOR SUPPORTING TELECOMMUNICATIONS SERVICES

(71) Applicant: AT&T Intellectual Property I, L.P., Atlanta, GA (US)

(72) Inventors: Manikka Thyagarajan, Short Hills, NJ (US); Kaustubh Joshi, Scotch Plains, NJ (US); Ganeshkumar Natarajan, Morganville, NJ (US); Israel L. Means, Chula Vista, CA (US); Michael L. Hammer, Dike, TX (US); Praveen Ramadenu, Manalapan, NJ (US); Shobhna Goyal, Marlboro, NJ (US); Marius J. Gudelis, Holmdel, NJ (US); Satyendra Tripathi, East Brunswick, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 55 days.

(21) Appl. No.: 17/107,394

(22) Filed: Nov. 30, 2020

(65) Prior Publication Data
US 2021/0112119 A1     Apr. 15, 2021

Related U.S. Application Data

(63) Continuation of application No. 16/225,050, filed on Dec. 19, 2018, now Pat. No. 10,855,757.

(51) Int. Cl.
*G06F 9/455* (2018.01)
*H04L 67/1074* (2022.01)
(52) U.S. Cl.
CPC ...... *H04L 67/1076* (2013.01); *G06F 9/45558* (2013.01); *H04L 67/1078* (2013.01);
(Continued)

(58) Field of Classification Search
CPC ............ H04L 67/1076; H04L 67/1078; G06F 9/45558; G06F 2009/45562; G06F 2009/45595
(Continued)

(56) References Cited

U.S. PATENT DOCUMENTS 7,450,498 B2   11/2008   Golia et al.
7,464,151 B1   12/2008   Drennen et al.
(Continued)

OTHER PUBLICATIONS

Chang et al., "High-Performed Virtualization Services for In-Cloud Enterprise Resource Planning System," Journal of Information Hiding and Multimedia Signal Processing, Oct. 2014, vol. 5, No. 4, pp. 614-624.
(Continued)

*Primary Examiner* — Thu Ha T Nguyen
(74) *Attorney, Agent, or Firm* — Hartman & Citrin LLC

(57) ABSTRACT

The concepts and technologies disclosed herein provide high availability and high utilization cloud data center architecture for supporting telecommunications services. According to one aspect of the concepts and technologies disclosed herein, a 4-site model of application placement within the cloud computing environment provides 37.5% resource utilization with site availability of five 9s (99.999%) and virtual machine availability of five 9s. According to another aspect of the concepts and technologies disclosed herein, a 3-site model of application placement within the cloud computing environment provides 66% resource utilization with site availability of five 9s and virtual machine availability of five 9s. According to another aspect of the concepts and technologies disclosed herein, a 4-site model of application placement within the cloud computing environment provides 75% resource utilization with site availability of five 9s and virtual machine availability of five 9s.

20 Claims, 31 Drawing Sheets

(52) U.S. Cl.
CPC .............. *G06F 2009/45562* (2013.01); *G06F 2009/45595* (2013.01)

(58) Field of Classification Search
USPC ................................ 709/200, 201, 202, 203
See application file for complete search history.

(56) References Cited

U.S. PATENT DOCUMENTS

| | | | |
|---|---|---|---|
| 7,909,880 B1 | 3/2011 | Grant | |
| 7,933,987 B2 | 4/2011 | Aidun et al. | |
| 8,160,063 B2 | 4/2012 | Maltz et al. | |
| 8,394,132 B2 | 3/2013 | Lewis et al. | |
| 8,438,277 B1 | 5/2013 | Chepuri et al. | |
| 8,510,625 B1 | 8/2013 | Back et al. | |
| 9,246,994 B2 | 1/2016 | Julien et al. | |
| 9,420,422 B1 | 8/2016 | Rice | |
| 9,483,258 B1 | 11/2016 | Labat et al. | |
| 9,529,883 B2 | 12/2016 | Bourbonnais et al. | |
| 9,582,559 B1 | 2/2017 | Faibish et al. | |
| 9,679,008 B2 | 6/2017 | Vosshall et al. | |
| 9,852,027 B2 | 12/2017 | Simoncelli | |
| 9,877,752 B2 | 1/2018 | Tyber et al. | |
| 9,998,862 B1 | 6/2018 | Rice | |
| 10,264,586 B2* | 4/2019 | Beattie, Jr. | H04W 72/046 |
| 10,353,603 B1 | 7/2019 | Baruch | |
| 10,397,280 B2* | 8/2019 | Sood | H04L 63/20 |
| 10,423,634 B1 | 9/2019 | Shemer | |
| 10,432,537 B2* | 10/2019 | Zhang | H04L 43/08 |
| 10,432,552 B2* | 10/2019 | Zhang | G06F 9/5038 |
| 10,521,223 B1* | 12/2019 | Bogushefsky, III | G06F 9/45504 |
| 10,530,740 B2* | 1/2020 | Jana | H04L 67/10 |
| 10,587,465 B1 | 3/2020 | Sandham | |
| 10,855,757 B2* | 12/2020 | Thyagarajan | H04L 67/1095 |
| 10,880,180 B2* | 12/2020 | Zhang | H04L 41/5064 |
| 11,184,233 B1* | 11/2021 | Neelakantam | H04L 67/1095 |
| 11,228,497 B2* | 1/2022 | Maes | H04L 41/5041 |
| 11,340,837 B1* | 5/2022 | Vohra | G06F 9/4856 |
| 11,403,000 B1* | 8/2022 | Barker, Jr. | G06F 3/0664 |
| 11,416,298 B1* | 8/2022 | Barker, Jr. | G06F 11/3034 |
| 2002/0174050 A1* | 11/2002 | Eynard | G06Q 40/04 705/37 |
| 2003/0154236 A1 | 8/2003 | Dar et al. | |
| 2006/0153068 A1 | 7/2006 | Dally et al. | |
| 2009/0245137 A1 | 10/2009 | Hares et al. | |
| 2010/0228819 A1 | 9/2010 | Wei | |
| 2013/0268672 A1 | 10/2013 | Justafort et al. | |
| 2014/0207918 A1* | 7/2014 | Kowalski | H04L 41/0803 709/220 |
| 2015/0082302 A1 | 3/2015 | Cheng et al. | |
| 2016/0218939 A1 | 7/2016 | Tiwari | |
| 2016/0246648 A1 | 8/2016 | Karnath et al. | |
| 2016/0255139 A1* | 9/2016 | Rathod | H04N 1/32101 709/203 |
| 2016/0291876 A1* | 10/2016 | Alatorre | G06F 3/0685 |
| 2017/0031700 A1 | 2/2017 | Yasrebi | |
| 2017/0034117 A1 | 2/2017 | Yasrebi | |
| 2017/0034318 A1 | 2/2017 | Gong et al. | |
| 2017/0034346 A1 | 2/2017 | Yasrebi | |
| 2017/0034359 A1 | 2/2017 | Yasrebi | |
| 2017/0041296 A1 | 2/2017 | Ford | |
| 2017/0094377 A1* | 3/2017 | Herdrich | H04Q 9/02 |
| 2017/0332421 A1* | 11/2017 | Sternberg | H04W 76/11 |
| 2018/0039580 A1 | 2/2018 | Schneider | |
| 2018/0070100 A1* | 3/2018 | Chen | H04N 19/174 |
| 2018/0077024 A1* | 3/2018 | Zhang | H04L 41/0896 |
| 2018/0191859 A1* | 7/2018 | Sharma | H04L 67/60 |
| 2018/0260745 A1* | 9/2018 | Jana | G06F 9/4806 |
| 2018/0295067 A1* | 10/2018 | Xia | H04L 41/5003 |
| 2018/0337942 A1* | 11/2018 | Htay | G06F 16/00 |
| 2018/0349202 A1* | 12/2018 | Sharma | G06F 9/5077 |
| 2018/0367412 A1* | 12/2018 | Sethi | H04L 41/40 |
| 2019/0036869 A1* | 1/2019 | Jana | H04L 61/5014 |
| 2019/0171492 A1* | 6/2019 | Yousaf | G06F 9/5061 |
| 2019/0223055 A1* | 7/2019 | Bor Yaliniz | H04W 24/02 |
| 2019/0243547 A1 | 8/2019 | Duggal | |
| 2019/0243688 A1 | 8/2019 | Karmarkar | |
| 2019/0243702 A1 | 8/2019 | Shilane | |
| 2019/0245918 A1 | 8/2019 | Xu | |
| 2019/0379731 A1* | 12/2019 | Johnsen | G06F 9/5088 |
| 2020/0065086 A1 | 2/2020 | Woodmansee | |
| 2020/0067776 A1* | 2/2020 | Williams | H04L 41/0876 |
| 2020/0136825 A1 | 4/2020 | Gupta | |
| 2020/0160208 A1 | 5/2020 | Tan | |
| 2020/0160227 A1 | 5/2020 | Liu | |
| 2020/0162323 A1* | 5/2020 | Abu Lebdeh | H04L 41/0806 |
| 2020/0244551 A1* | 7/2020 | Tidemann | H04L 41/5025 |
| 2020/0274375 A1* | 8/2020 | Griffiths | B60R 16/033 |
| 2020/0314126 A1* | 10/2020 | Schmugar | H04W 12/12 |
| 2020/0366493 A1* | 11/2020 | Sood | H04L 9/3239 |
| 2021/0019063 A1* | 1/2021 | Lee | G06F 3/0637 |
| 2021/0021494 A1* | 1/2021 | Yao | G06N 5/04 |
| 2021/0037400 A1* | 2/2021 | Yao | H04W 24/02 |
| 2021/0112119 A1* | 4/2021 | Thyagarajan | G06F 9/45558 |
| 2021/0144517 A1* | 5/2021 | Guim Bernat | H04L 9/0637 |
| 2021/0184925 A1* | 6/2021 | Narayanan | H04L 41/083 |
| 2021/0360083 A1* | 11/2021 | Duggal | H04L 67/34 |
| 2022/0014450 A1* | 1/2022 | Srikanteswara | H04L 41/5019 |
| 2022/0019367 A1* | 1/2022 | Freilich | G06F 3/067 |
| 2022/0019385 A1* | 1/2022 | Karr | G06F 3/0607 |
| 2022/0035541 A1* | 2/2022 | Genereux | G06F 3/067 |
| 2022/0035714 A1* | 2/2022 | Schultz | G06F 11/1438 |
| 2022/0044480 A1* | 2/2022 | Zavesky | G06T 1/0021 |
| 2022/0075546 A1* | 3/2022 | Potyraj | G06F 11/2094 |
| 2022/0083245 A1* | 3/2022 | Kant | G06F 3/0632 |
| 2022/0124560 A1* | 4/2022 | Yeh | H04W 28/26 |
| 2022/0158926 A1* | 5/2022 | Wennerström | H04L 43/20 |
| 2022/0179685 A1* | 6/2022 | Lemoine | G06F 9/4856 |
| 2022/0197773 A1* | 6/2022 | Butler | H04N 21/234 |
| 2022/0231964 A1* | 7/2022 | Alam | H04L 47/74 |
| 2022/0232423 A1* | 7/2022 | Thyagaturu | H04W 28/08 |
| 2022/0247678 A1* | 8/2022 | Atwal | H04W 12/033 |
| 2022/0248296 A1* | 8/2022 | Merwaday | H04W 36/14 |
| 2022/0300418 A1* | 9/2022 | Baugh | G06F 12/109 |
| 2022/0391124 A1* | 12/2022 | Darji | G06F 3/0679 |

OTHER PUBLICATIONS

Cully et al., "Remus: High Availability via Asynchronous Virtual Machine Replication," Proceedings of the 5th USENIX Symposium on Networked Systems Design and Implementation, Apr. 16-18, 2008, pp. 161-174.

Hawilo, Hassan, "Elastic Highly Available Cloud Computing," Electronic Thesis and Dissertation Repository, Aug. 2015.

Li et al., "Improving Availability of Cloud-Based Applications through Deployment Choices," 2013 IEEE Sixth International Conference on Cloud Computing, Jun. 28-Jul. 3, 2013, pp. 43-50, IEEE 2013.

Almasi et al., "Toward building highly available and scalable OpenStack clouds," IBM Journal of Research and Development, Mar./May 2016, vol. 60, No. 2/3, Paper 5.

U.S. Office Action dated May 15, 2020 in U.S. Appl. No. 16/225,050.

U.S. Notice of Allowance dated Sep. 16, 2020 in U.S. Appl. No. 16/225,050.

* cited by examiner

HIGH AVAILABILITY AND HIGH UTILIZATION CLOUD DATA CENTER ARCHITECTURE FOR SUPPORTING TELECOMMUNICATIONS SERVICES

CROSS-REFERENCE TO RELATED APPLICATIONS

This application is a continuation of and claims priority to U.S. patent application Ser. No. 16/225,050, entitled "High Availability and High Utilization Cloud Data Center Architecture for Supporting Telecommunications Services," filed Dec. 19, 2018, now U.S. Pat. No. 10,855,757, which is incorporated herein by reference in its entirety.

BACKGROUND

Cloud computing allows dynamically scalable virtualized resources to host applications and services. Cloud computing enables appropriate levels of resources to power software applications when and where the resources are needed in response to demand. As a result, cloud computing allows entities to respond quickly, efficiently, and in an automated fashion to rapidly changing business environments.

Paramount to any computing platform is availability. Availability is typically measured as a percentage of time during which a given computing system is operational. While optimal availability is 100%, this is often not achievable. The current standard of "high availability" is often referred to as "five 9s" or 99.999% availability. Over a period of 1 year, a computing system operating at five 9s availability will experience only 5 minutes and 36 seconds of downtime.

Five 9s availability has long been the goal of system administrators, whether the target system is a telecom or computing system. With the recent trend of cloud computing being used as a replacement for hardware-based solutions, the concept of five 9s availability has taken a backseat to the ease of simply instantiating new instances of an application or service to counteract lower-than-average availability. However, as cloud computing becomes more ubiquitous, cloud providers will endeavor once again to reach five 9s availability.

Next generation applications, such as Internet of Things ("IoT"), connected cars, remote surgery, augmented reality, virtual reality, video streaming, 5G voice and data applications, and others, require real-time sensitive applications running on cloud resources to provide such services. These applications, in addition to stringent real-time performance requirements (e.g., latency, jitter, etc.), demand five 9s availability to provide such services.

In addition to availability and real-time performance requirements, a primary indicator of system performance is utilization. Utilization generally refers to the energy efficiency of a system. Many existing cloud computing models operate with low utilization. In other words, cloud computing resources are often left idle consuming electricity but not performing any tasks. As more and more applications and services are moved to the cloud, utilization will need to increase while maintaining high availability and real-time performance requirements.

SUMMARY

The concepts and technologies disclosed herein provide a high availability and high utilization cloud data center architecture for supporting telecommunications services. The high availability and high utilization cloud data center architecture can include a plurality of sites (also referred to as geo-sites or geo-regions) representing specific geographical locations in which computing resources are located. Each site can include one or more availability zones ("AZs"), each of which represents an isolated physical location within a site. Site resources of a given site are available to any AZ within that site. Zonal resources are available only in the associated AZ. Machines in different AZs have no single point of failure. Availability regions ("AR") (also referred to as cloud instances) are isolated instances of a cloud controller and associated cloud resources within an AZ. AR resources are available only in the corresponding AR. In some embodiments, AZ resources also can be shared across multiple ARs within the corresponding AZ.

An instance of a machine, a virtual machine ("VM"), an application, a container POD, a container instance, or a container cluster can be instantiated in any site, AZ, or AR. A collection of VMs together can provide a service such as, for example, connected car, 5G voice and data service, and others. A local redundancy model for a service can spread VMs locally in a site across AZs and ARs to manage AZ and/or AR failures. Another level of redundancy, referred to herein as geo-redundancy, can spread a service across sites to manage site failures. In spreading VMs across AZs in different ARs, the real-time performance requirements (e.g., latency, jitter, etc.) of these services still need to be met. In general, an AR provides for resiliency within an AZ and enables high availability and higher cloud resource utilization while providing capabilities to meet the stringent real-time requirements of the services.

According to one aspect of the concepts and technologies disclosed herein, a 4-site local and geo-redundancy model for application placement within a cloud computing environment provides 37.5% cloud resource utilization with site availability of five 9s (99.999%) and virtual machine availability of five 9s. In particular, a plurality of sites operating as part of the cloud computing environment can include, for example, a first site, a second site, a third site, and a fourth site. The first site can include a first availability zone ("AZ") that, in turn, includes a first availability region ("AR") and a second AR. The first AR can include a first server and the second AR includes a second server. The first server can include a first virtual machine, and the second server can include a second virtual machine. The second site can include a second AZ that, in turn, includes a first duplicate of the first AR and a first duplicate of the second AR. The first duplicate of the first AR can include a first duplicate of the first server and the first duplicate of the second AR can include a first duplicate of the second server. The first duplicate of the first server can include a first duplicate of the first virtual machine. The first duplicate of the second server can include a first duplicate of the second virtual machine. The third site can include a third AZ that, in turn, includes a second duplicate of the first AR and a second duplicate of the second AR. The second duplicate of the first AR can include a second duplicate of the first server and the second duplicate of the second AR can include a second duplicate of the second server. The second duplicate of the first server can include a second duplicate of the first virtual machine. The second duplicate of the second server can include a second duplicate of the second virtual machine. The fourth site can include a fourth AZ that, in turn, includes a third duplicate of the first AR and a third duplicate of the second AR. The third duplicate of the first AR can include a third duplicate of the first server and the third duplicate of the second AR can include a third duplicate of the second server.

The third duplicate of the first server can include a third duplicate of the first virtual machine. The third duplicate of the second server can include a third duplicate of the second virtual machine. The VMs across ARs and within an AZ can be connected via a layer 3 or layer 2 network. The plurality of sites also can be connected via a layer 3 or layer 2 network. The first server and the second server can be connected via a first layer 2 connection within the first AZ. The first duplicate of the first server and the first duplicate of the second server can be connected via a second layer 2 connection within the second AZ. The second duplicate of the first server and the second duplicate of the second server can be connected via a third layer 2 connection within the third AZ. The third duplicate of the first server and the third duplicate of the second server can be connected via a fourth layer 2 connection within the fourth AZ.

According to another aspect of the concepts and technologies disclosed herein, a 3-site local and geo-redundancy model for application placement within the cloud computing environment provides 66% cloud resource utilization with site availability of five 9s and virtual machine availability of five 9s. In particular, a plurality of sites operating as part of the cloud computing environment can include, for example, a first site, a second site, and a third site. The first site can include a first AZ that, in turn, includes a first AR, a second AR, and a third AR. The first AR can include a first server, the second AR can include a second server, and the third AR can include a third server. The first server can include a first virtual machine, the second server can include a second virtual machine, and the third server can include a third virtual machine. The second site can include a second AZ that, in turn, includes a first duplicate of the first AR, a first duplicate of the second AR, and a first duplicate of the third AR. The first duplicate of the first AR can include a first duplicate of the first server, the first duplicate of the second AR can include a first duplicate of the second server, and the first duplicate of the third AR can include a first duplicate of the third server. The first duplicate of the first server can include a first duplicate of the first virtual machine, the first duplicate of the second server can include a first duplicate of the second virtual machine, and the first duplicate of the third server can include a first duplicate of the third virtual machine. The third site can include a third AZ that, in turn, includes a second duplicate of the first AR, a second duplicate of the second AR, and a second duplicate of the third AR. The second duplicate of the first AR can include a second duplicate of the first server, the second duplicate of the second AR can include a second duplicate of the second server, and the second duplicate of the third AR can include a second duplicate of the third server. The second duplicate of the first server can include a second duplicate of the first virtual machine. The second duplicate of the second server can include a second duplicate of the second virtual machine, and the second duplicate of the third server can include a second duplicate of the third virtual machine. The VMs across ARs and within an AZ can be connected via a layer 3 or layer 2 network. The plurality of sites also can be connected via a layer 3 or layer 2 network. The first server, the second server, and the third server can be connected via a first layer 2 connection within the first AZ. The first duplicate of the first server, the first duplicate of the second server, and the first duplicate of the third server can be connected via a second layer 2 connection within the second AZ. The second duplicate of the first server, the second duplicate of the second server, and the second duplicate of the third server can be connected via a third layer 2 connection within the third AZ.

According to another aspect of the concepts and technologies disclosed herein, a 4-site local and geo-redundancy model for application placement within the cloud computing environment provides 75% cloud resource utilization with site availability of five 9s and virtual machine availability of five 9s. In particular, a plurality of sites operating as part of a cloud computing environment can include, for example, a first site, a second site, a third site, and a fourth site. The first site can include a first AZ that, in turn, includes a first AR, a second AR, a third AR, and a fourth AR. The first AR can include a first server, the second AR can include a second server, the third AR can include a third server, and the fourth AR can include a fourth server. The first server can include a first virtual machine, the second server can include a second virtual machine, the third server can include a third virtual machine, and the fourth server can include a fourth virtual machine. The second site can include a second AZ that, in turn, includes a first duplicate of the first AR, a first duplicate of the second AR, a first duplicate of the third AR, and a first duplicate of the fourth AR. The first duplicate of the first AR includes a first duplicate of the first server, the first duplicate of the second AR includes a first duplicate of the second server, the first duplicate of the third AR includes a first duplicate of the third server, and the first duplicate of the fourth AR includes a first duplicate of the fourth server. The first duplicate of the first server can include a first duplicate of the first virtual machine, the first duplicate of the second server can include a first duplicate of the second virtual machine, the first duplicate of the third server can include a first duplicate of the third virtual machine, and the first duplicate of the fourth server can include a first duplicate of the fourth virtual machine. The third site can include a third AZ that, in turn, includes a second duplicate of the first AR, a second duplicate of the second AR, a second duplicate of the third AR, and a second duplicate of the fourth AR. The second duplicate of the first AR can include a second duplicate of the first server, the second duplicate of the second AR can include a second duplicate of the second server, the second duplicate of the third AR can include a second duplicate of the third server, and the second duplicate of the fourth AR can include a second duplicate of the fourth server. The second duplicate of the first server can include a second duplicate of the first virtual machine, the second duplicate of the second server can include a second duplicate of the second virtual machine, the second duplicate of the third server can include a second duplicate of the third virtual machine, and the second duplicate of the fourth server can include a second duplicate of the fourth virtual machine. The fourth site can include a fourth AZ that, in turn, includes a third duplicate of the first AR, a third duplicate of the second AR, a third duplicate of the third AR, and a third duplicate of the fourth AR. The third duplicate of the first AR can include a third duplicate of the first server, the third duplicate of the second AR can include a third duplicate of the second server, the third duplicate of the third AR can include a third duplicate of the third server, and the third duplicate of the fourth AR can include a third duplicate of the fourth server. The third duplicate of the first server can include a third duplicate of the first virtual machine, the third duplicate of the second server can include a third duplicate of the second virtual machine, the third duplicate of the third server can include a third duplicate of the third virtual machine, and the third duplicate of the fourth server can include a third duplicate of the fourth virtual machine. The VMs across ARs within an AZ can be connected via a layer 3 or layer 2 network. The plurality of sites also can be connected via a layer 3 or layer 2 network. The first server, the second server, the third server, and the fourth server can be connected via a first layer 2 connection within the first AZ. The first duplicate of the first server, the first duplicate of the second server, the first duplicate of the third server, and the first duplicate of the fourth server can be connected via a second layer 2 connection within the second AZ. The second duplicate of the first server, the second duplicate of the second server, the second duplicate of the third server, and the second duplicate of the fourth server can be connected via a third layer 2 connection within the third AZ. The third duplicate of the first server, the third duplicate of the second server, the third duplicate of the third server, and the third duplicate of the fourth server can be connected via a fourth layer 2 connection within the fourth AZ.

In some embodiments, the cloud computing environment can detect an event within one of the plurality of sites. The event can include a planned event or an unplanned event. A planned event can include an upgrade to at least a portion of one of the plurality of sites. An unplanned event can include a failure of a least a portion of one of the plurality of sites. In response to the event, the cloud computing environment can redirect traffic from a first portion of the plurality of sites to a second portion of the plurality of sites.

In some embodiments, each of the virtual machines can provide, at least in part, a real-time service. Each of the virtual machines can be an instance of a virtual network function ("VNF") that provides traditional or evolving mobility networking functions, such as access network elements, core network elements, transport network elements, and others, from purpose-built hardware to commercial-off-the-shelf ("COTS") server-based platforms, such as those operating within the aforementioned servers. The real-time service can include, particularly, a voice service that can benefit greatly from the high availability and high utilization characteristics provided by the aforementioned models.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The practice standard for deployment of information technology ("IT") applications in a cloud computing environment is to use availability zones to achieve resiliency. Many cloud service providers, such as AWS by Amazon Web Services, Inc., rely on availability zones for application deployment. These service providers can cope with increases in latency and jitter common with such practices. Telecommunications service providers may use cloud computing environments to deploy virtual network functions ("VNFs") that provide various network functionality in support of real-time services, such as voice and data services. Most telecommunications VNFs cannot exploit availability zones for resiliency due to high latency and high jitter. Currently, the use of availability zones in a cloud computing environment results in very low cloud resource utilization (e.g., on the order of peak utilization of around 25% and average utilization of around 13%) to achieve high availability (i.e., five 9s of availability). This creates issues for telecommunications service providers, since deployment and maintenance of a cloud computing environment with low utilization and high availability significantly increases capital expenditures ("capex") and operational expenditures ("opex") to meet high availability requirements.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1A:
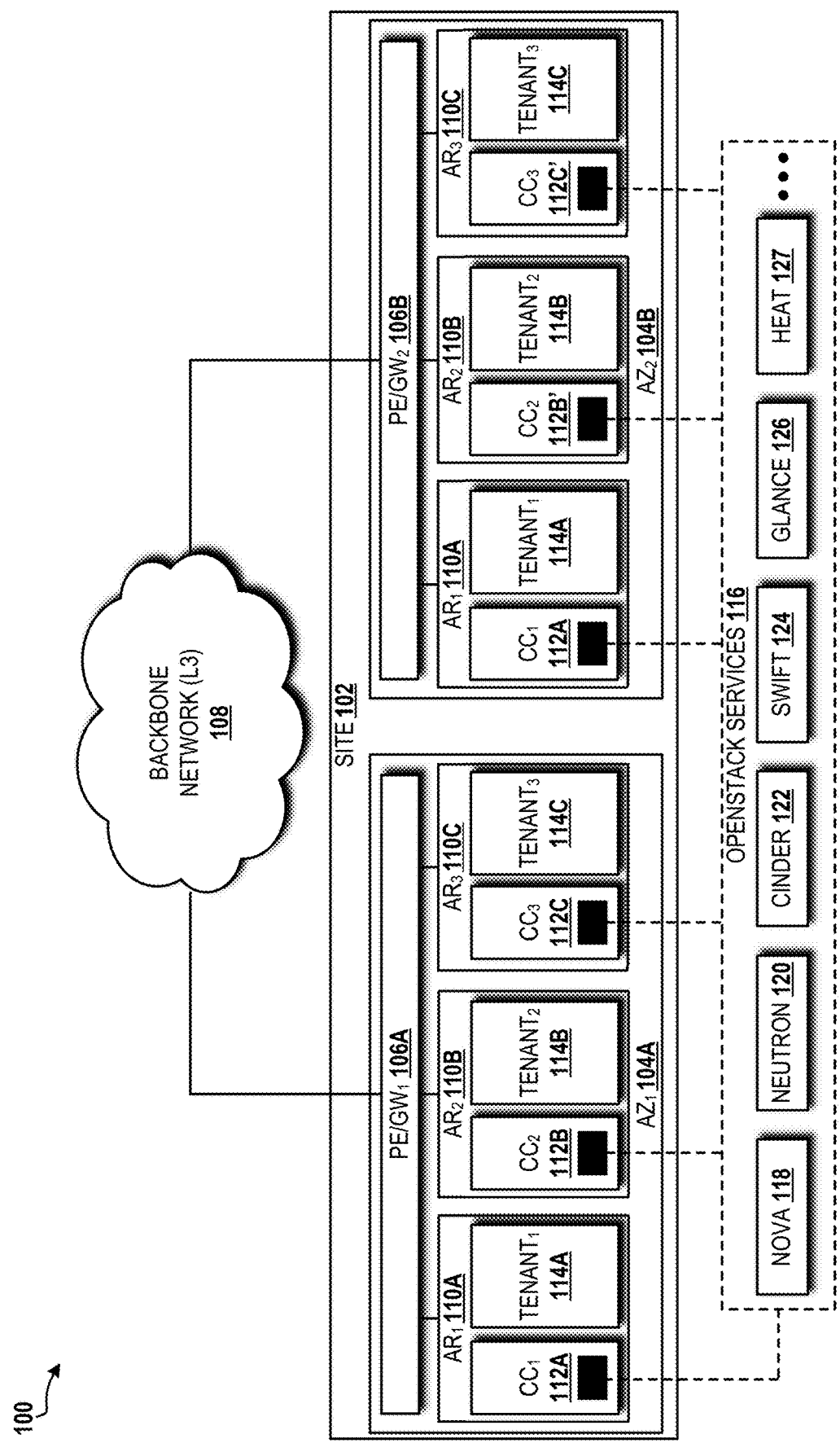
FIG. 1A is a block diagram illustrating an example availability region ("AR") and availability zone ("AZ") distribution model in a high availability cloud data center architecture implemented in a cloud computing environment to support real-time services, according to an illustrative embodiment.

Referring now to FIG. 1A, a block diagram illustrating an example availability region ("AR") and availability zone ("AZ") distribution model in a high availability cloud data center architecture implemented in a cloud computing environment 100 to support real-time services will be described. The cloud computing environment 100 illustrates a data center site ("site") 102 (also referred to as a geo-site or a geo-region) that is representative of a geographical location in which hardware resources of a data center operating as part of the cloud computing environment 100 are located. As used herein, a "data center" refers to a computing facility that includes one or more switches (e.g., core switches, top-of-rack switches, spine switches, leaf switches, and/or the like) and one or more server racks that, in turn, can include one or more servers upon which one or more virtual machines ("VMs") can be executed. As used herein, a "VM" refers to a software-based computing system that runs one or more operating systems and/or one or more applications. Although VMs are illustrated and referenced throughout this disclosure, the cloud computing environment 100 alternatively can include other virtualized resources, such as virtual network functions ("VNFs"), virtual volumes, virtual networks, virtual containers, and/or other virtualized resources.

Figure 1B:
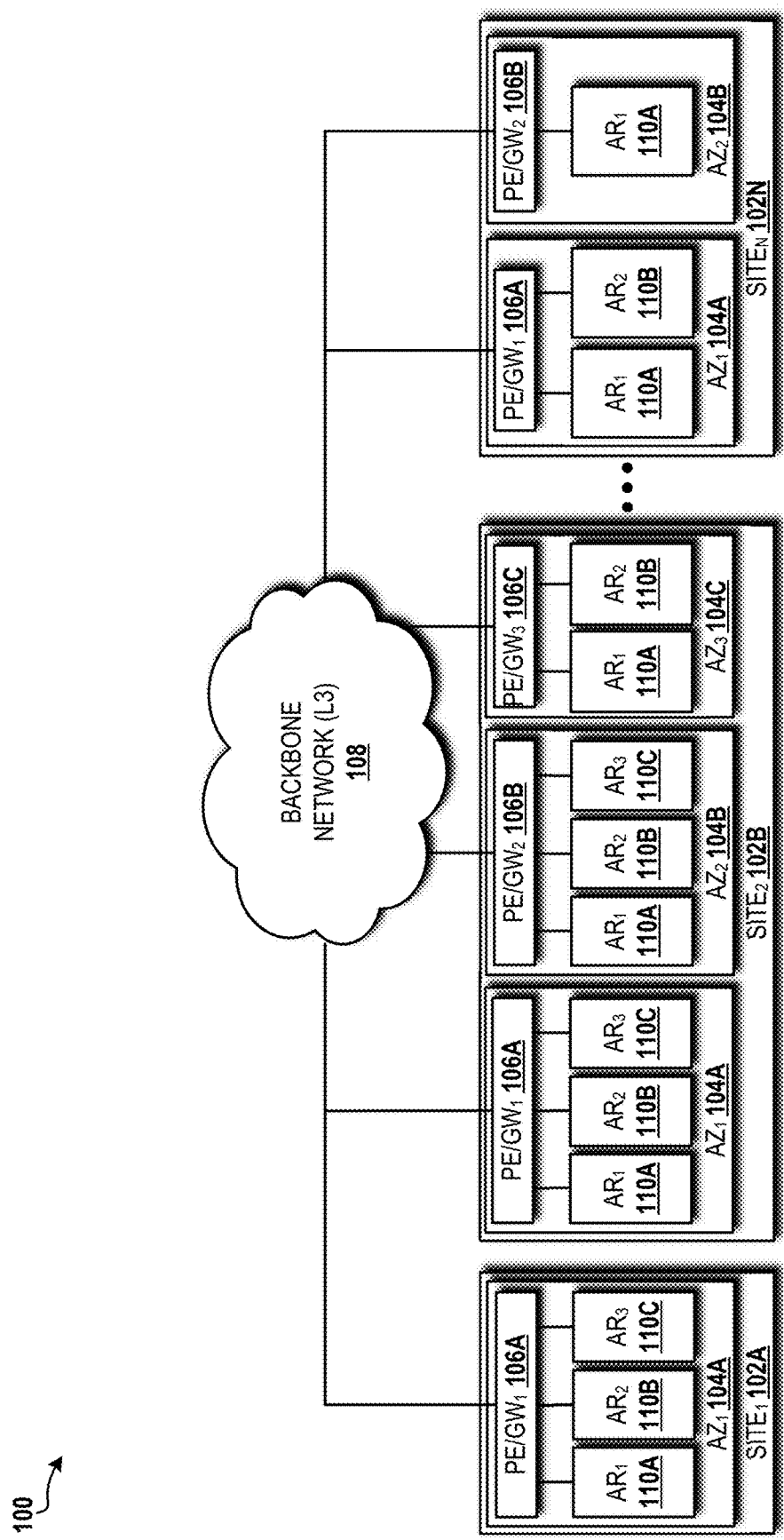
FIG. 1B is a block diagram illustrating another example AR and AZ distribution model in the high availability cloud data center architecture implemented in the cloud computing environment to support real-time services, according to an illustrative embodiment.

The site 102 can be identified, for example, by the city, such as San Diego, Houston, or New York, in which hardware resources operating in one or more data centers of the cloud computing environment 100 are located. The site 102 is not intended to encompass the entirety of a named location (e.g., San Diego), but instead a general area in which the hardware resources are located. Alternatively, the site 102 can identify general areas, such as, for example, North-United States, South-United States, East-United States, or West-United States. Although only a single site 102 is illustrated, the cloud computing environment 100 can include any number of sites 102. An example multi-site configuration of the cloud computing environment 100 is shown in FIG. 1B.

A given site 102 can include any number of AZs 104, each of which represents an isolated physical location within the site 102, and each of which can be defined by a provider edge/gateway ("PE/GW") 106 that designates a service demarcation for connectivity between resources in an AZ 104 and a backbone network (i.e., layer 3 "L3" network) 108. The illustrated site 102 includes a first AZ ("$AZ_1$") 104A and a second AZ ("$AZ_2$") 104B defined by a first PE/GW ("$PE/GW_1$") 106A and a second PE/GW ("$PE/GW_2$") 106B, respectively. A site 102 identified as "San Diego" might include multiple AZs, such as "San Diego 1," "San Diego 2," and so on.

In accordance with the concepts and technologies disclosed herein, and different from current availability zone distribution models used to achieve resiliency in real-time applications deployed in a cloud, a given AZ 104 can include any number of ARs 110 (alternatively referred to as "cloud instances"), each having a local control plane ("LCP") that includes a server (not shown in FIG. 1) hosting a cloud controller ("CC") 112 instance that manages a pool of tenant servers (shown as "tenant 114"; single tenant server configurations are also contemplated) hosting one or more applications, such as one or more VNFs that support one or more real-time services.

In the illustrated embodiment, the $AZ_1$ 104A includes a first AR ("$AR_1$") 110A that, in turn, includes a first CC ("$CC_1$") 112A that manages a first pool of tenant servers ("$tenant_1$") 114A; a second AR ("$AR_2$") 110B that, in turn, includes a second CC ("CC$_2$") 112B that manages a second pool of tenant servers ("tenant$_2$") 114B; and a third AR ("AR$_3$") 110C that, in turn, includes a third CC ("CC$_3$") 112C that manages a third pool of tenant servers ("tenant$_3$") 114C. The AZ$_2$ 104B duplicates the configuration of the AZ$_1$ 104A for high availability, and as such, the elements in each AZ 104 of the site 102 are identified using the same numbering scheme. This numbering scheme is used throughout the description of the remaining FIGURES. Moreover, references to the AZs 104, the PE/GWs 106, the ARs 110, the CCs 112, and the tenants 114 hereinafter can be interpreted as an instance thereof. For example, both the AZ$_1$ 104A and the AZ$_2$ 104B shown in the configuration of the cloud computing environment 100 in FIG. 1A include an instance of the AR$_1$ 110A, the AR$_2$ 110B, and the AR$_3$ 110C to illustrate an embodiment of the redundancy that can provided by the cloud computing environment 100 in accordance with some of the concepts and technologies disclosed herein.

Each of the CCs 112 provides a set of cloud controller services 116, such as compute services, networking services, storage services, orchestration services, and other services. In the illustrated embodiment, the cloud controller services 116 are OPENSTACK services, including Nova 118, Neutron 120, Cinder 122, Swift 124, Glance 126, Heat 127, and other services (not shown), each accessible via application programming interfaces ("APIs"; not shown) exposed by OPENSTACK. Nova 118 is an OPENSTACK service that allows the provisioning of compute instances (e.g., virtual machines, bare metal servers, and containers). Neutron 120 is an OPENSTACK service that provides network connectivity as-a-service between interface devices (e.g., virtual network interface controllers) managed by other OPENSTACK services, such as Nova 118. Cinder 122 is an OPENSTACK service that provides tools to manage storage resources consumed by compute instances created by Nova 118. Swift 124 is an OPENSTACK service that provides tools for data storage in the cloud. Glance 126 is an OPENSTACK service that facilitates discovery, registration, and retrieval of virtual machine images and associated metadata. Heat 127 is an OPENSTACK service that orchestrates cloud applications using a declarative template format through an OPENSTACK REST API. An example portion of a Heat 127 template for use in accordance with the concepts and technologies disclosed herein is described herein below with reference to FIG. 5. OPENSTACK is well-documented and understood by those skilled in the art. Therefore, additional details regarding OPENSTACK in general and the OPENSTACK services 116 particularly referenced herein are not provided, since those skilled in the art will readily understand the capabilities of OPENSTACK as pertinent to the concepts and technologies disclosed herein. It should be understand that the use of OPENSTACK herein is only an example software platform upon which the concepts and technologies disclosed herein can be implemented, and software platforms for cloud computing are contemplated, and the applicability of which would be understood by one skilled in the art.

Network functions virtualization ("NFV") is a new technology initiative that aims to move traditional and evolving mobility networking functions, such as access network elements, core network elements, transport network elements, and others, from purpose-built hardware to commercial-off-the-shelf ("COTS") server-based platforms, such as those operating within servers disclosed herein. This is achieved through virtualization of mobility networking functions to create VNFs that operate on COTS hardware. The VNFs can perform any telecommunications function in support of one or more real-time services, including, particularly, voice services that benefit greatly from high availability.

In some embodiments, the cloud computing environment 100 is or includes a software-defined network ("SDN"). SDN is an architectural framework that provides a software-centric cloud environment for creating intelligent networks that are programmable, application aware, and more open. SDN provides an agile and cost-effective communications platform for handling the dramatic increase in data traffic on carrier networks by providing a high degree of scalability, security, and flexibility. SDN provides several benefits over traditional networks. SDN allows for the creation of multiple virtual network control planes on common hardware. SDN helps extend service virtualization and software control into many existing network elements. SDN enables applications to request and manipulate services provided by the network and to allow the network to expose network states back to the applications. SDN exposes network capabilities through application programming interfaces ("APIs"), making the control of network equipment remotely accessible and modifiable via third-party software clients using open protocols such as OpenFlow, available from Open Network Forum ("ONF").

Combining SDN and NFV functionality, such as in Domain 2.0, available from AT&T, provides a highly complex and dynamic set of relationships between virtual, logical, and physical resources. Networks, such as embodied in Domain 2.0 deployments, provide intelligent software systems and applications operating on general purpose commodity hardware (e.g., COTS). This not only drives down capital expenditures, ongoing operational costs, and helps to configure networks with less human intervention, but also creates significant opportunities to scale and monetize existing and new intelligent services.

Within service providers, such as AT&T, orchestration systems like control, orchestration, management, and policy ("ECOMP") have been created to dramatically reduce monotonous tasks and monitoring required by human operators through data-based analytics. Current orchestration systems often incite frustration among operators due to overcomplicated network status readouts, non-specific network manipulations automatically performed by the orchestration system, and the inability to quickly "revert" changes caused by such manipulations. AT&T's ECOMP has been combined with the Open Orchestrator Project ("OPEN-O") to create the Open Network Automation Platform ("ONAP") project supported by the Linux Foundation. ONAP is an open source software platform that delivers capabilities for the design, creation, orchestration, monitoring, and life cycle management of SDNs and the VNFs operating therein, as well as higher-level services that utilize the functionality of SDN/VNF. ONAP provides automatic, policy-driven interaction of these functions and services in a dynamic, real-time cloud environment, such as the cloud computing environment 100.

In some embodiments, the cloud computing environment 100 provides, at least in part, Infrastructure-as-a-Service ("IaaS"), through which the tenants(s) 114 can interact with a front end (not shown) to provision processing, storage, networks, and other computing resources, whereby the tenants(s) 114 is/are able to deploy and run software, which can include, for example, VNFs to provide, at least in part, one or more telecommunications service(s) for the tenants 114 and/or others such as users or subscribers to the service(s). The tenant(s) 114 do not manage or control the underlying cloud infrastructure of the cloud computing environment 100, but have control over operating systems, storage, and deployed applications, and in some implementations, limited control of select networking components (e.g., host firewalls and/or other security components).

In some embodiments, the cloud computing environment 100 is provided as part of a private cloud infrastructure. A private cloud infrastructure is a cloud infrastructure that is provisioned for exclusive use by a single organization, which can include multiple users. A private cloud infrastructure might be owned, managed, and operated by the organization, a third party, or some combination thereof. A private cloud infrastructure can exist on or off premises. The tenant 114 can access a private cloud infrastructure provided, at least in part, by the cloud computing environment 100 via a front end, which can be provided by and/or accessed through a client, such as a web client application, or a native client application, for example.

In some embodiments, the cloud computing environment 100 is provided as part of a community cloud infrastructure. A community cloud infrastructure is a cloud infrastructure that is provisioned for exclusive use by a specific community of users from organizations that have shared concerns (e.g., mission, security requirements, policy, and compliance considerations). A community cloud infrastructure might be owned, managed, and operated by one or more organizations in the community, a third party, or some combination thereof. A community cloud infrastructure may exist on or off premises. The tenant 114 can access a community cloud infrastructure provided, at least in part, by the cloud computing environment 100 via a front end, which can be provided by and/or accessed through a client, such as a web client application, or a native client application, for example.

In some embodiments, the cloud computing environment 100 is provided as part of a public cloud infrastructure. A public cloud infrastructure is a cloud infrastructure that is provisioned for open use by the general public. A public cloud infrastructure might be owned, managed, and operated by a business, academic, or government organization, or some combination thereof. A public cloud infrastructure exists on the premises of the cloud service provider. The tenants 114 can access a public cloud infrastructure provided, at least in part, by the cloud computing environment 100 via a front end, which can be provided by and/or accessed through a client, such as a web client application, or a native client application, for example.

In some embodiments, the cloud computing environment 100 is provided as part of a hybrid cloud infrastructure. A hybrid cloud infrastructure is a cloud infrastructure that is a composition of two or more distinct cloud infrastructures—private, community, or public—that remain unique entities, but are bound together by standardized or proprietary technology that enables data and application portability. The tenants 114 can access a hybrid cloud infrastructure provided, at least in part, by the cloud computing environment 100 via a front end, which can be provided by and/or accessed through a client, such as a web client application, or a native client application, for example.

Referring now to FIG. 1B, a block diagram illustrating another example AR and AZ distribution model in a high availability cloud data center architecture implemented in the cloud computing environment 100 to support real-time services will be described, according to an illustrative embodiment. The distribution model used by the cloud computing environment 100 in FIG. 1B illustrates a plurality of sites 102A-102N, including a first site ("SITE$_1$") 102A, a second site ("SITE$_2$") 102B, and an N$^{th}$ site ("SITE$_N$")

102N. The SITE$_1$ 102A includes a single AZ 104—that is, the AZ$_1$ 104A defined by the PE/GW$_1$ 106A that designates a service demarcation for connectivity between cloud resources in the AZ$_1$ 104A and the backbone network 108. The SITE$_2$ 102B includes three AZs 104, including the AZ$_1$ 104A, the AZ$_2$ 104B, and the AZ$_3$ 104C, defined, respectively, by the PE/GW$_1$ 106A, the PE/GW$_2$ 106B, and the PE/GW$_3$ 106C that designate service demarcations for connectivity between cloud resources in a corresponding AZ 104 and the backbone network 108. The SITE$_N$ 102N includes two AZs 104, including the AZ$_1$ 104A and the AZ$_2$ 104B, defined, respectively, by the PE/GW$_1$ 106A and the PE/GW$_2$ 106B that designate service demarcations for connectivity between cloud resources in a corresponding AZ 104 and the backbone network 108. Each of the instances of the AZ$_1$ 104A in the SITE$_1$ 102A and the SITE$_2$ 102B include the AR$_1$ 110A, the AR$_2$ 110B, and the AR$_3$ 110C, as does the AZ$_2$ 104B in the SITE$_2$ 102B. The AZ$_3$ 104C instance in the SITE$_2$ 102B includes the AR$_1$ 110A and the second AR$_2$ 110B, as does the AZ$_1$ 104A in SITE$_N$ 102N. The AZ$_2$ 104B instance in the SITE$_N$ 102N includes the AR$_1$ 110A. The SITE$_N$ 102N is illustrative of three 9s (i.e., 99.9%) availability that can be achieved with a single AR 110 (see AZ$_2$ 104B in the SITE$_N$ 102N), and of five 9s (i.e., 99.999%) availability that can be achieved with two or more ARs 110 (see AZ$_1$ 104A in the SITE$_N$ 102N). The CCs 112 and the tenants 114 introduced in FIG. 1A are not shown in FIG. 1B, but the ARs 110 should be interpreted as including at least one CC 112 and at least one tenant 114 such as in the configuration of the cloud computing environment 100 described above with reference to FIG. 1A.

Figure 1C:
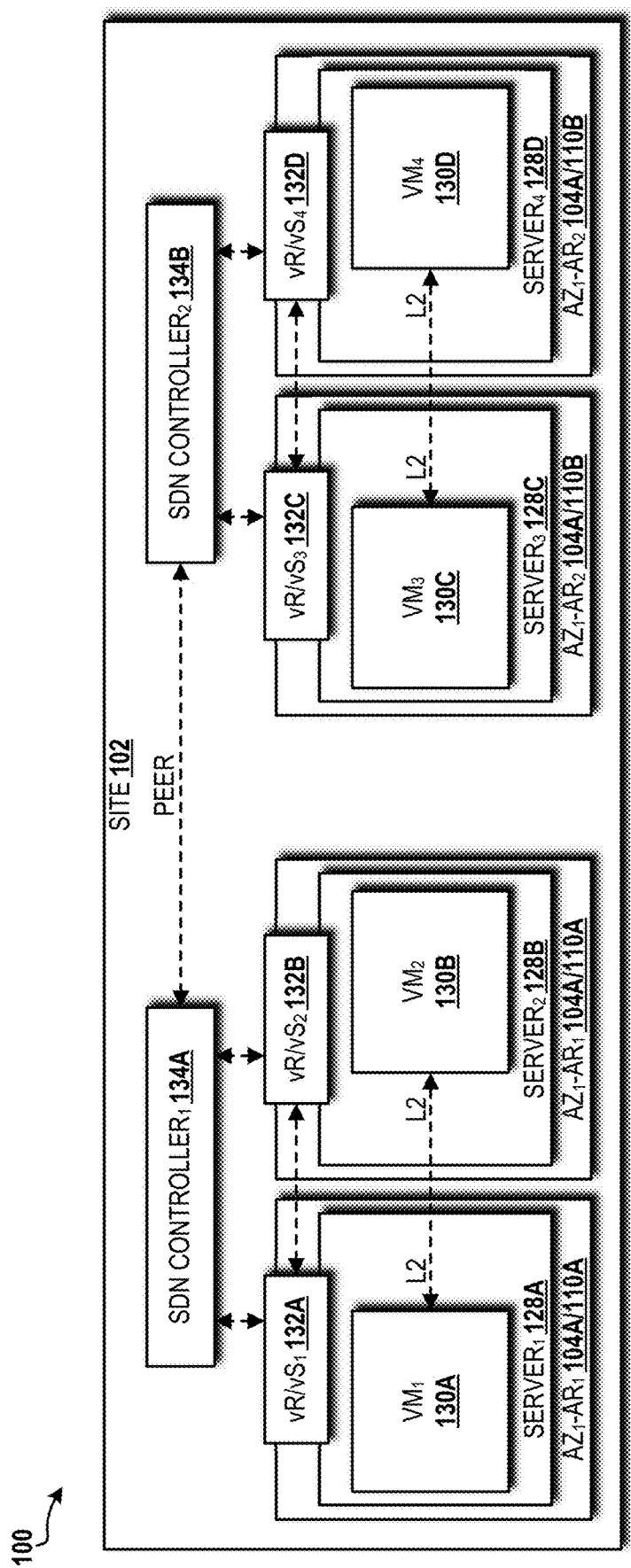
FIG. 1C is a block diagram illustrating a networking configuration for the AR and AZ distribution models in the high availability cloud data center architecture implemented in the cloud computing environment to support real-time services, according to an illustrative embodiment.

Referring now to FIG. 1C, a block diagram illustrating a networking configuration for the aforementioned AR and AZ distribution models in a high availability cloud data center architecture implemented in the cloud computing environment 100 to support real-time services will be described, according to an illustrative embodiment. In the illustrated embodiment, the site 102 has one AZ 104 (AZ$_1$ 104A) and two ARs (AR$_1$ 110A and AR$_2$ 110B), with each AR 110 having two servers 128 (i.e., representative of the tenant 114) that, in turn, each include a VM 130 and a virtual router/virtual switch ("vR/vS") 132. In particular, the VM$_1$ 130A hosted by the server$_1$ 128A is communicatively connected to the VM$_2$ 130B hosted by the server$_2$ 128B via a layer 2 ("L2") connection, and the VM$_3$ 130C hosted by the server$_3$ 128C is communicatively connected to the VM$_4$ 130D in the server$_4$ 128D via another L2 connection. The vR/vS$_1$ 132A and the vR/vS$_2$ 132B are communicatively connected to each other and to a software-defined network ("SDN") controller$_1$ 134A, which communicates, via a peer-to-peer connection, with the SDN controllers 134B that serves the vR/vS$_3$ 132C and the vR/vS$_4$ 132D. The East-West communications between VMs 130 within a given AR 110 is typically layer 2, but alternatively can be layer 3.

Figure 2:
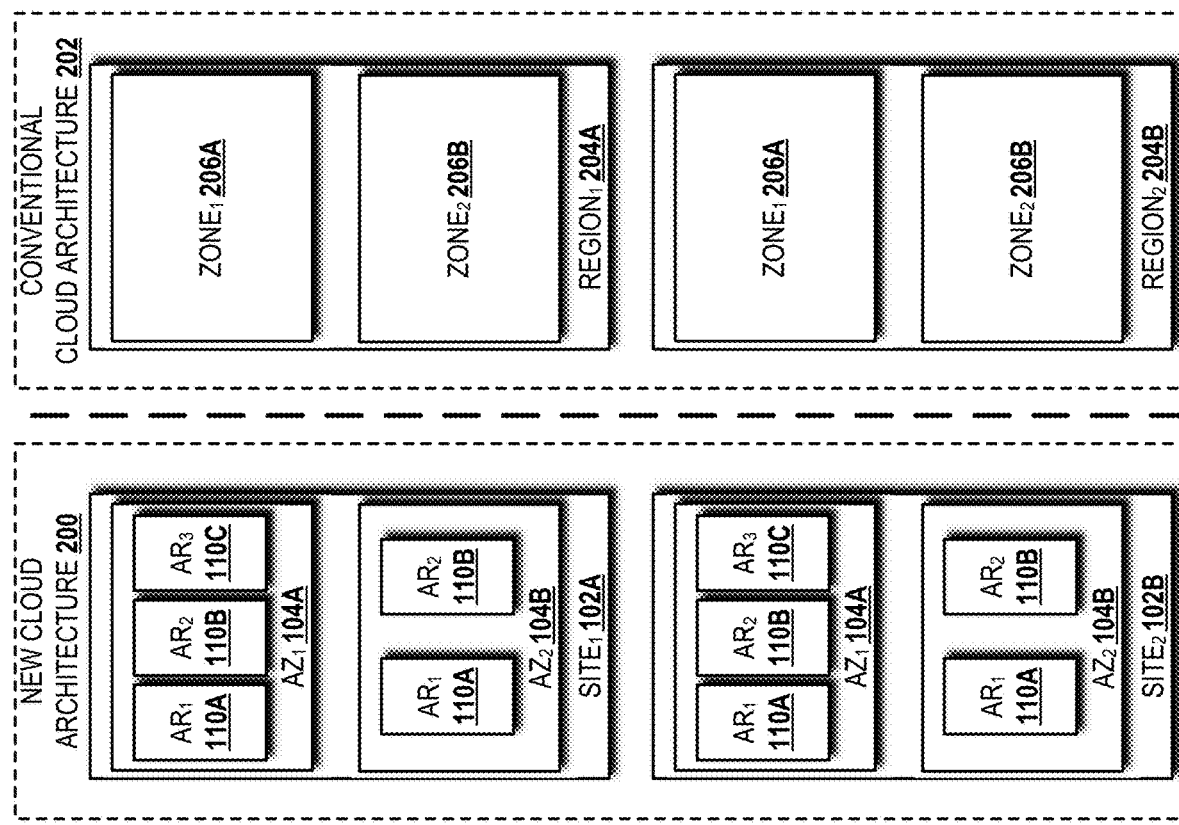
FIG. 2 is a block diagram illustrating a contrast between a new cloud architecture upon which the cloud computing environment can be deployed and a conventional cloud architecture, such as implemented, for example, in AWS by Amazon Web Services, Inc., according to an illustrative embodiment.

Referring now to FIG. 2, a block diagram illustrating a contrast between a new cloud architecture 200 upon which the cloud computing environment 100 can be deployed and a conventional cloud architecture 202, such as implemented, for example, in AWS by Amazon Web Services, Inc. will be described. In the illustrated example, the new cloud architecture 200 includes the SITE" 102A and the SITES 102B, each having instances of the AZ$_1$ 104A and the AZ$_2$ 104B. The AZ$_1$ 104A in both sites 102A-102B includes instances of the AR$_1$ 110A, the AR$_2$ 110B, and the AR$_3$ 110C. The AZ$_2$ 104B in both sites 102 includes instances of the AR$_1$ 110A and the AR$_2$ 110B. In contrast to the new cloud architecture 200, the conventional cloud architecture 202 includes two regions 204 (REGION$_1$ 204A and REGIONS 204B), each of which includes two zones 206 (ZONE$_1$ 206A and ZONE$_2$ 206B).

Table 1 below shows the availability and latency achieved with the new cloud architecture 200 and the conventional cloud architecture 202. The new cloud architecture 200 is capable of offering five 9s availability within the sites 102A-102B, the AZs 104A-104B, and the ARs 110A-110C. The conventional cloud architecture 202 also is capable of offering five 9s availability within the regions 204A-204B (as compared to the sites 102), but fails to provide such high availability in the zones 206A-206B (as compared to the AZs 104). Moreover, the conventional cloud architecture 202 does not offer the additional distribution granularity provided by the ARs 110A-110C in the new cloud architecture 200, which also are capable of offering five 9s availability. Latency remains the same (>2 ms) for communications between AZs 104A-104B in the new cloud architecture 200 and between zones 206A-206B in the conventional cloud architecture 202. Latency less than 2 ms (i.e., low latency) is achievable for communications between the

| | | NEW CLOUD ARCHITECTURE | CONVENTIONAL CLOUD ARCHITECTURE |
|---|---|---|---|
| AVAIL-ABILITY | SITE/GEO-REGION | 5 9's | 5 9's |
| | AZ/Zone | 5 9's | 3 9's |
| | AR/Cloud Instance | 3 9's | N/A |
| LATENCY | AZ to AZ/Zone to Zone | >2 ms | >2 ms |
| | AR to AR | <2 ms | N/A |

ARs 110A-110C. Since the conventional cloud architecture 202 fails to provide a demarcation similar such as provided by the ARs 110A-110C in the new cloud architecture 200, latency values associated with such a demarcation are not available for the conventional cloud architecture 202.

Figure 3A:
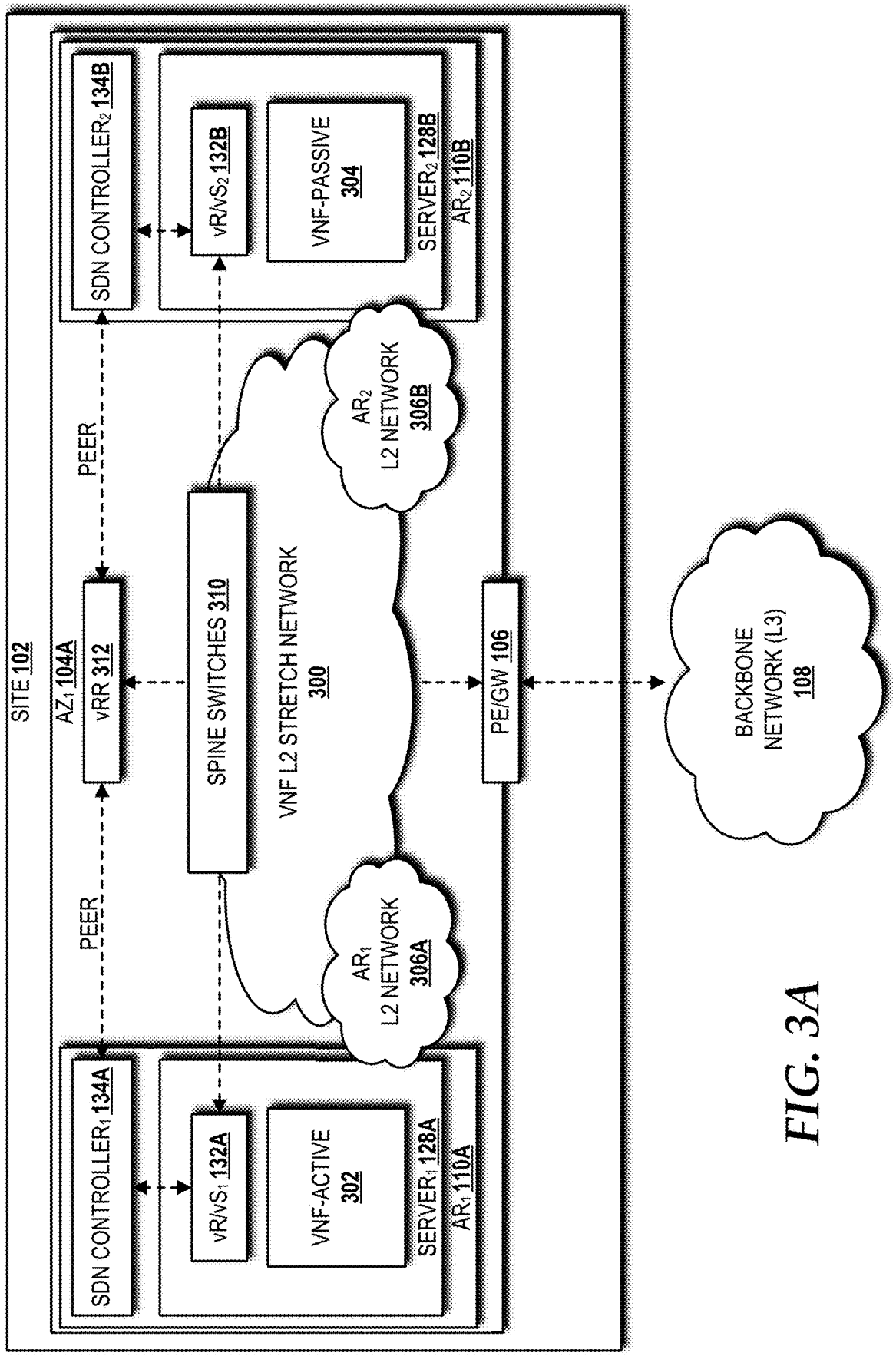
FIG. 3A is a block diagram illustrating an example stretch network for the AR and AZ distribution models in the high availability cloud data center architecture implemented in the cloud computing environment, according to an illustrative embodiment.

Referring now to FIG. 3A, a block diagram illustrating an example VNF L2 stretch network 300 for the AR and AZ distribution models in the high availability cloud data center architecture implemented in the cloud computing environment 100 will be described, according to an illustrative embodiment. In the illustrated embodiment, the cloud computing environment 100 includes the site 102 having one AZ 104 (AZ$_1$ 104A) and two ARs 110 (AR$_1$ 110A and AR$_2$ 110B). The AR$_1$ 110A hosts the server$_1$ 128A, which includes a VNF in an active state ("VNF-ACTIVE") 302 and the vR/vS$_1$ 132A. The AR$_2$ 110B hosts the servers 128B, which includes a VNF in a passive state ("VNF-PASSIVE") 304 and the vR/vS$_2$ 132B.

L2 networks within the AR$_1$ 110A and the AR$_2$ 110B are represented as the AR$_1$ L2 network 306A and the AR$_2$ L2 network 306B, respectively. The VNF L2 stretch network 300 utilizes Ethernet virtual private network ("EVPN") routes to stretch the AR$_1$ L2 network 306A and the AR$_2$ L2 network 306B between the ARs 110. East-to-west traffic between the ARs 110A-110B (i.e., via vR/vS$_1$ 132A to vR/vS$_2$ 132B) traverses the VNF L2 stretch network 300 through spine switches 310 (to achieve latency<2 ms) without the traffic being routed through the PE/GW 106.

The vR/vS$_1$ 132A and the vR/vS$_2$ 132B are communicatively connected to the SDN controller$_1$ 134A and the SDN controllers 134B, respectively. The SDN controllers 134A-134B communicate, via a peer-to-peer connection, with a virtual route reflector ("vRR") 312. The vRR 312 advertises, to the SDN controllers 134A-134B, IP addresses/routes and/or MAC addresses across the ARs 110A-110B. The SDN controllers 134A-134B instruct the vR/vSs 132A-132B to forward tenant traffic through the routes/addresses/MACs advertised by the vRR 312. Though the East-West communications between VMs 130 across ARs 110 is typically layer 2, and hence stretch L2 networks, it could be layer 3 as well. To meet the stringent real-time requirements, the L2/L3 traffic can be switched/routed within an AZ 104.

Figure 3B:
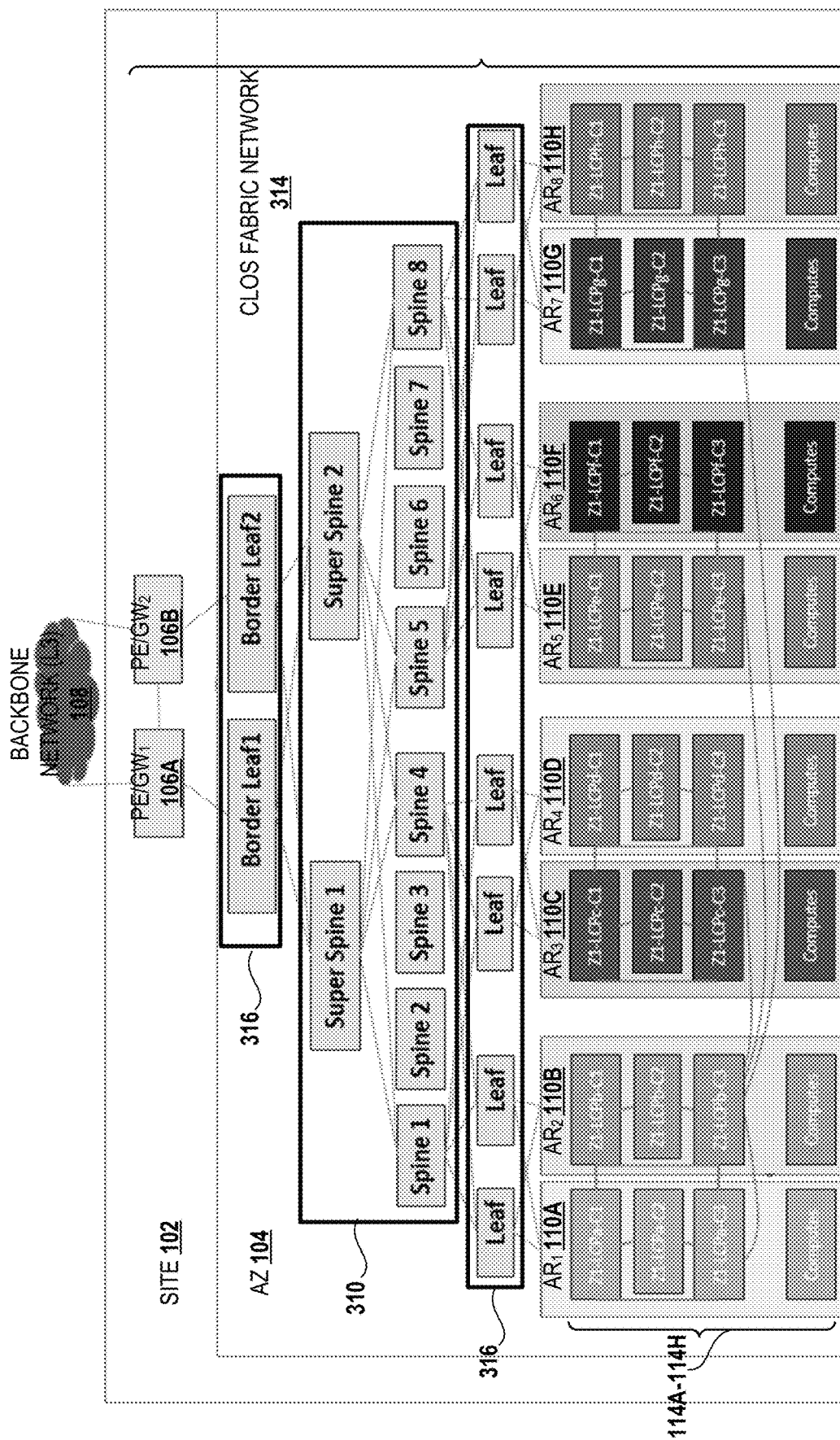
FIG. 3B is a block diagram illustrating a physical network topology for the AR and AZ distribution models in the high availability cloud data center architecture and implemented in the cloud computing environment, according to an illustrative embodiment.

Referring now to FIG. 3B, a block diagram illustrating a physical network topology for the AR and AZ distribution models in the high availability cloud data center architecture and implemented in the cloud computing environment 100 will be described, according to an illustrative embodiment. This topology scales to support the local cloud infrastructure and tenant traffic association with a tenant VNF layer 2 and layer 3 protocol adjacencies with each other and/or with the PE/GW 106. The physical network topology illustrates a data center with a multi-AR configuration in a single site 102 using a full CLOS fabric network 314. The site 102 has one AZ 104 defined by the PE/GWs 106A, 106B service demarcation that provides connectivity between resources in the AZ 104 and the backbone network 108. The full CLOS fabric network 314 includes the PE/GW 106 communicatively connected to leaf switches 316 (border leaf 1 and border leaf 2) that, in turn, are communicatively connected to the spine switches 310 (introduced above with reference to FIG. 3A—illustrated in a hierarchy including two super spine switches and eight spine switches) that, in turn, are communicatively connected to additional leaf switches 316, which provide connectivity to the ARs 110A-110H and the tenants 114A-114I1.

Figure 3C:
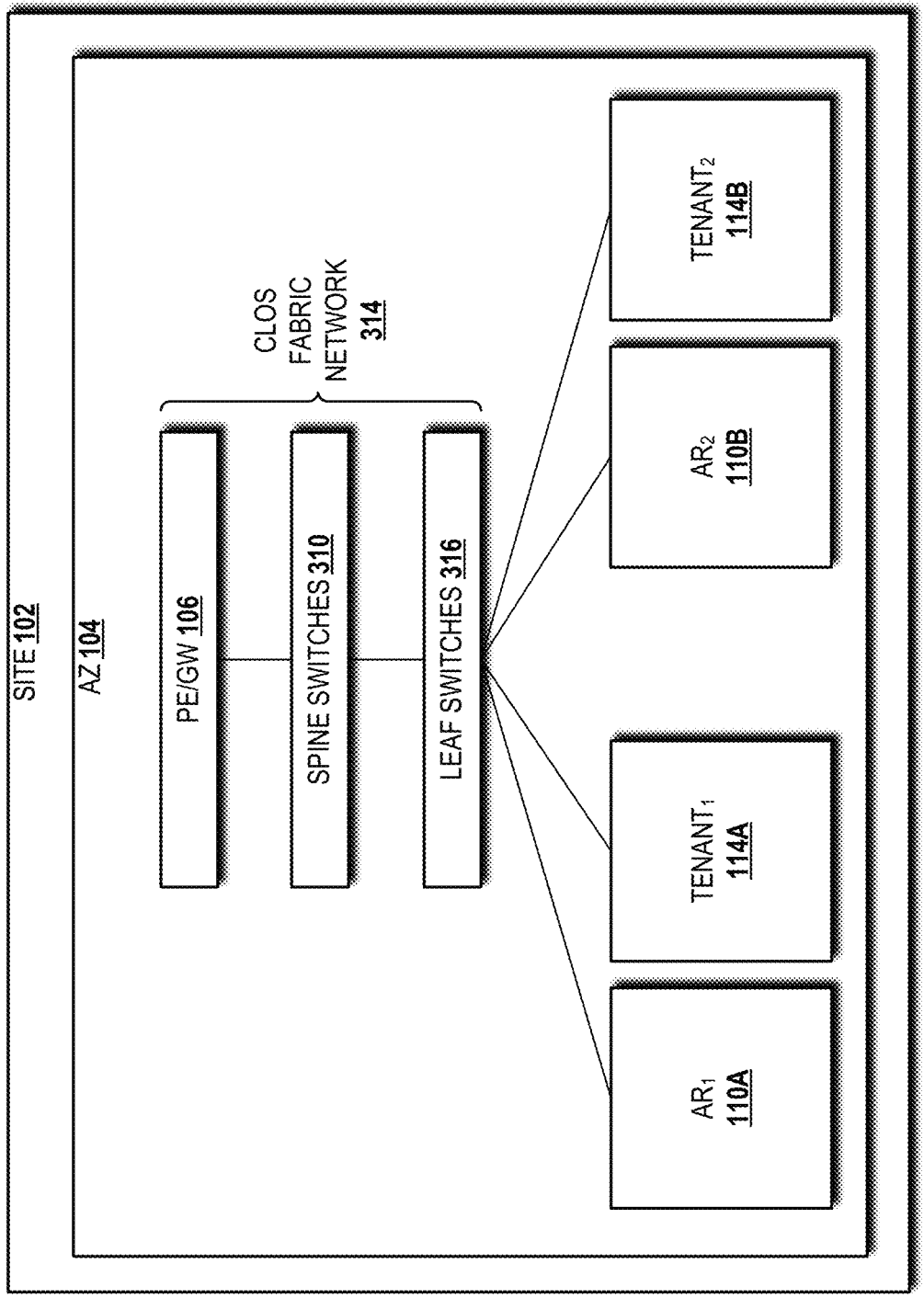
FIGS. 3C-3E are block diagrams illustrating site architectures for a data center with a multi-AR configuration, according to illustrative embodiments.
Figure 3D:
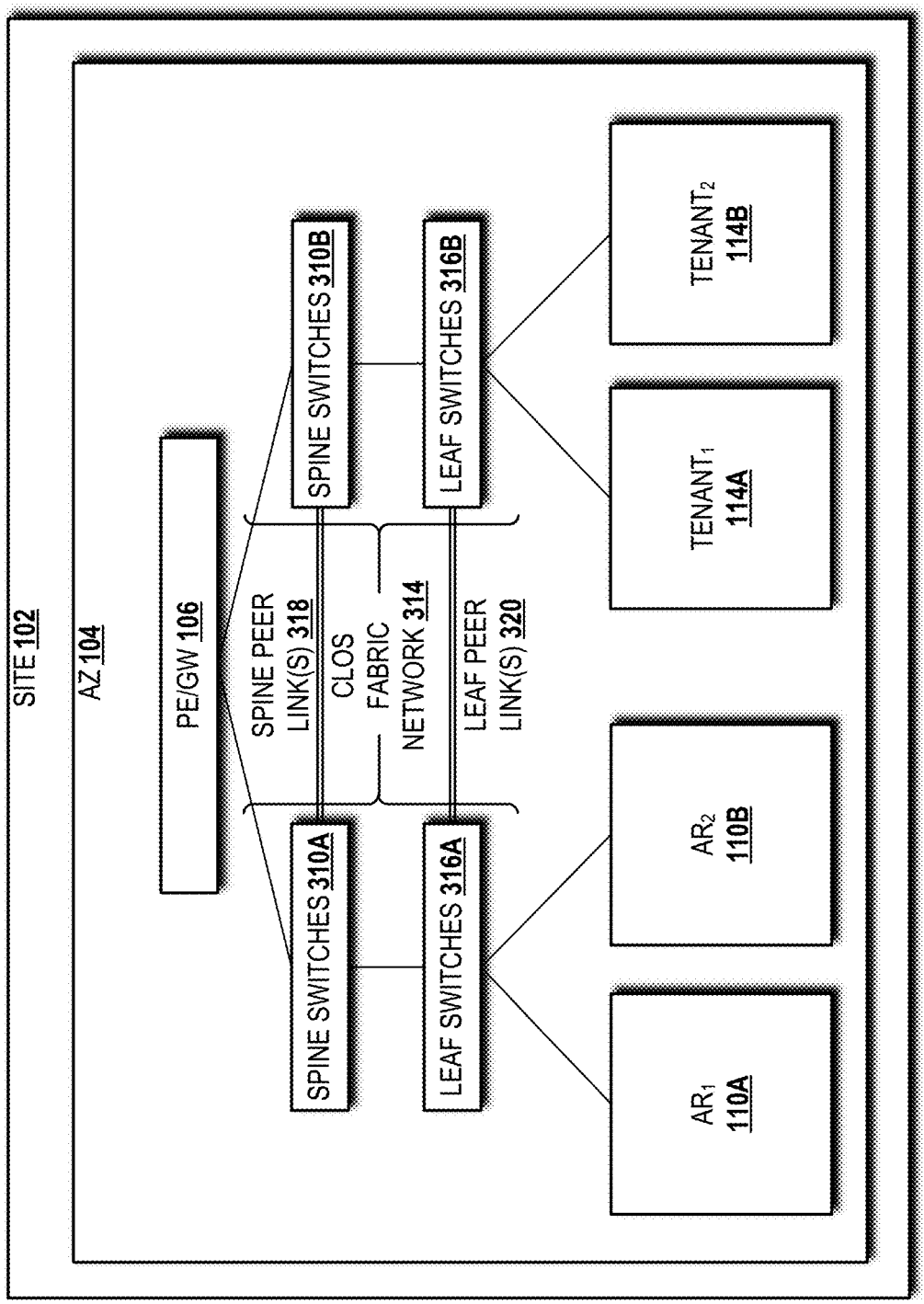
Figure 3E:
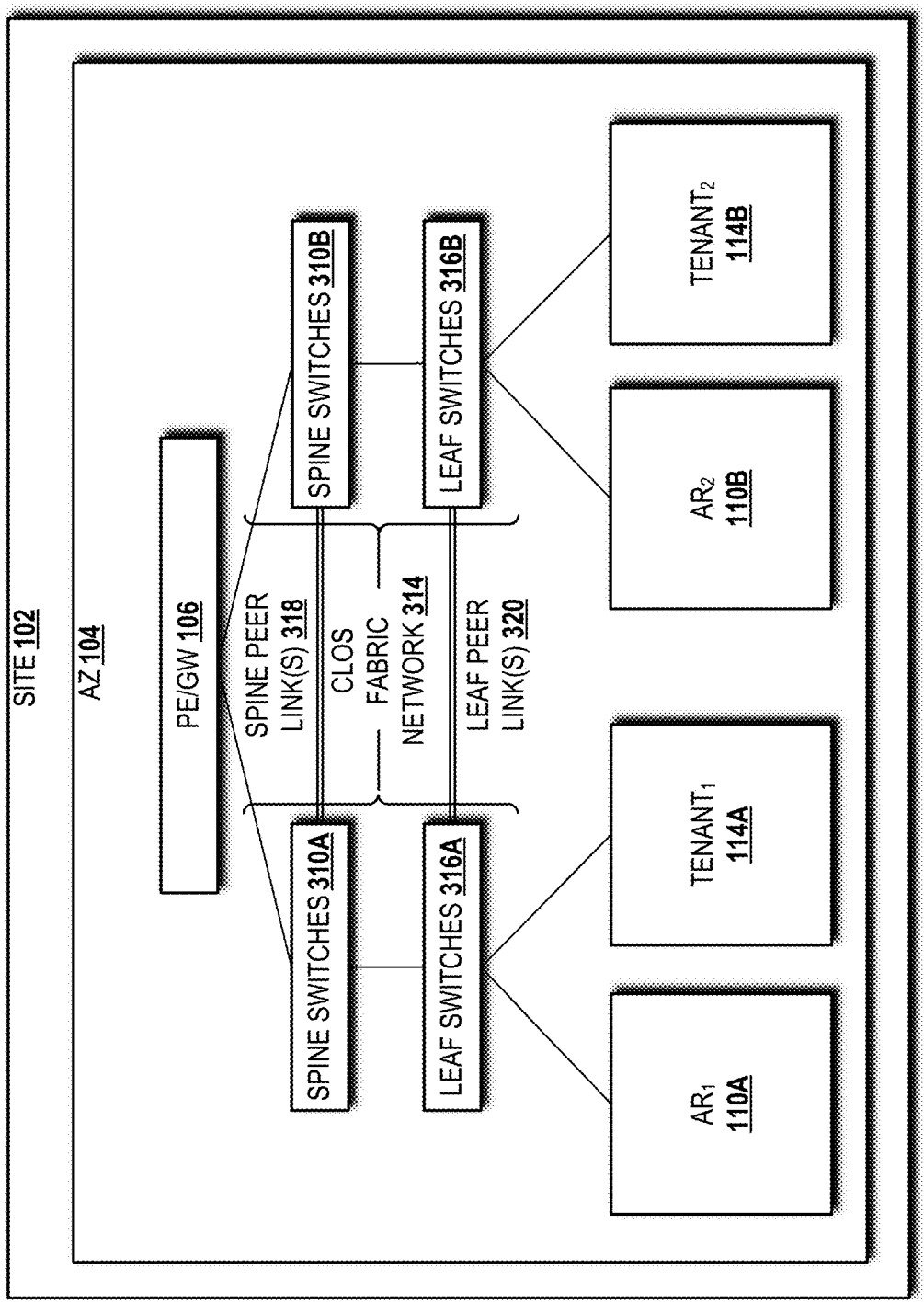

Referring now to FIGS. 3C-3E, site architectures for a data center with a multi-AR configuration will be described, according to illustrative embodiments. Turning first to FIG. 3C, an example site architecture shows a data center with a multi-AR configuration in a single site using an implementation of the full CLOS fabric network 314 (introduced above with reference to FIG. 3B), according to an illustrative embodiment. The first site architecture includes the site 102 having one AZ 104 defined by the PE/GW 106 service demarcation that provides connectivity between resources in the AZ 104 and the backbone network 108 (not shown in FIG. 3C). The illustrated implementation of the full CLOS fabric network 314 includes the PE/GW 106 communicatively connected to the spine switches 310 (introduced above with reference to FIG. 3A) that, in turn, are communicatively connected to the leaf switches 316 (also introduced above with reference to FIG. 3B), which provide connectivity to the ARs 110A-110B and the tenants 114A-114B.

Turning now to FIG. 3D, another example site architecture shows a data center with a multi-AR configuration in the site 102 using one or more spine peer links 318 and/or one or more leaf peer links 320, according to an illustrative embodiment. The illustrated example architecture includes the site 102 having one AZ 104 defined by the PE/GW 106 service demarcation that provides connectivity between resources in the AZ 104 and the backbone network 108 (not shown in FIG. 3D). In the illustrated embodiment, the CLOS fabric network 314 includes a first set of spine switches 310A communicatively connected to a first set of leaf switches 316A that provide connectivity to the ARs 110A-110B, and a second set of spine switches 310B communicatively connected to a second set of leaf switches 316B that provide connectively to the tenants 114A-114B. The first set of spine switches 310A is communicatively connected to the second set of spine switches 310B via the spine peer link(s)

318. The first set of leaf switches 316A is communicatively connected to the second set of leaf switches 316B via the leaf peer link(s) 320.

Turning now to FIG. 3E, another example site architecture shows a data center with a multi-AR configuration in the site 102 using the spine peer link(s) 318 and/or the leaf peer links 320, according to an illustrative embodiment. The illustrated example architecture includes the site 102 having one AZ 104 defined by the PE/GW 106 service demarcation that provides connectivity between resources in the AZ 104 and the backbone network 108 (not shown in FIG. 3E). In the illustrated embodiment, the CLOS fabric network 314 includes the first set of spine switches 310A communicatively connected to the first set of leaf switches 316A that provide connectivity to the $AR_1$ 110A and the $tenant_1$ 114A, and the second set of spine switches 310B communicatively connected to the second set of leaf switches 316B that provide connectivity to the $AR_2$ 110B and the $tenant_2$ 114B. The first set of spine switches 310A is communicatively connected to the second set of spine switches 310B via the spine peer link(s) 318. The first set of leaf switches 316A is communicatively connected to the second set of leaf switches 316B via the leaf peer link(s) 320.

Figure 3F:
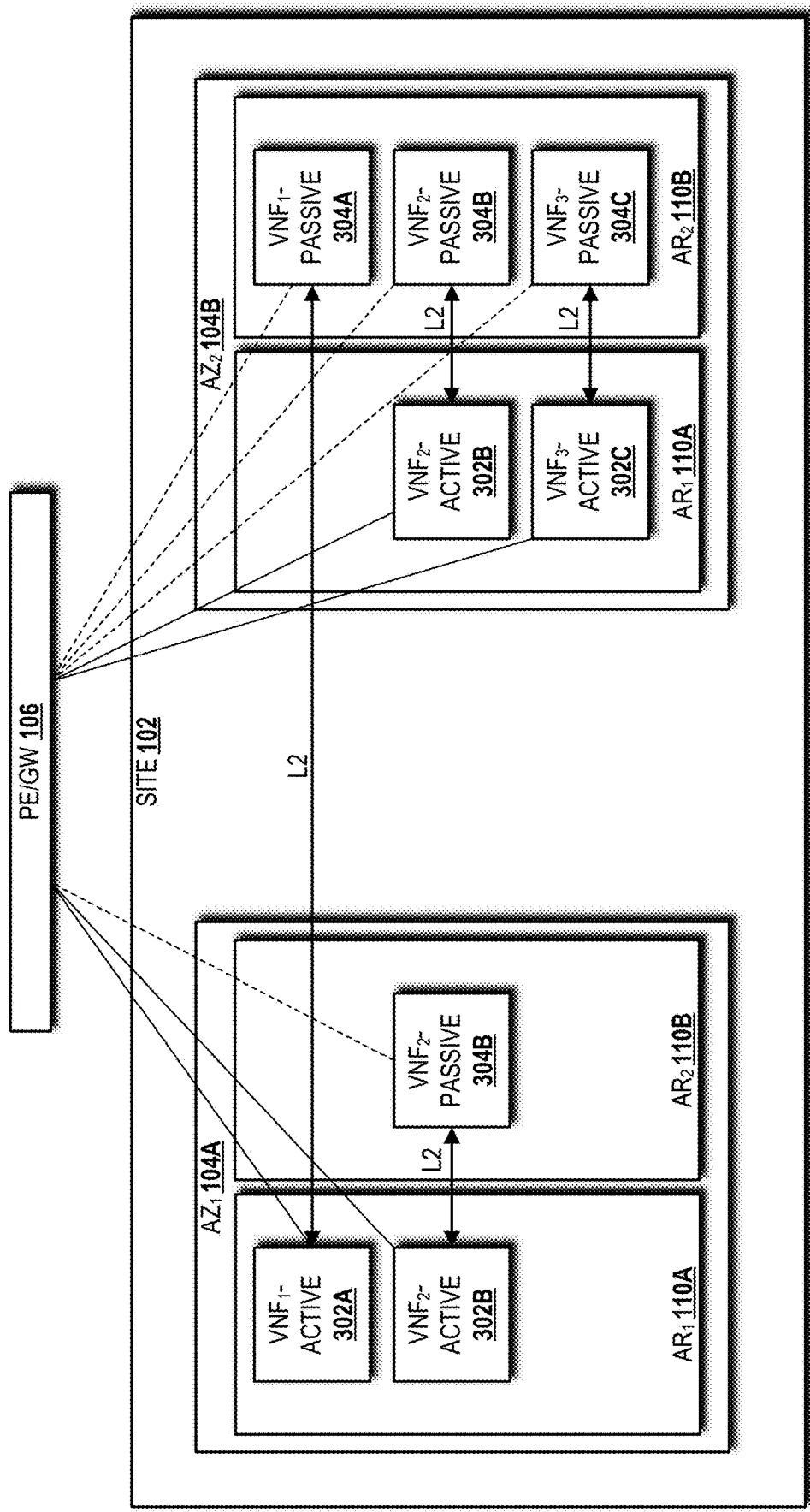
FIGS. 3F-3G are block diagrams illustrating a VNF configured in an active-passive distribution model within a site compared to a VNF in a cluster distribution model within the site.
Figure 3G:
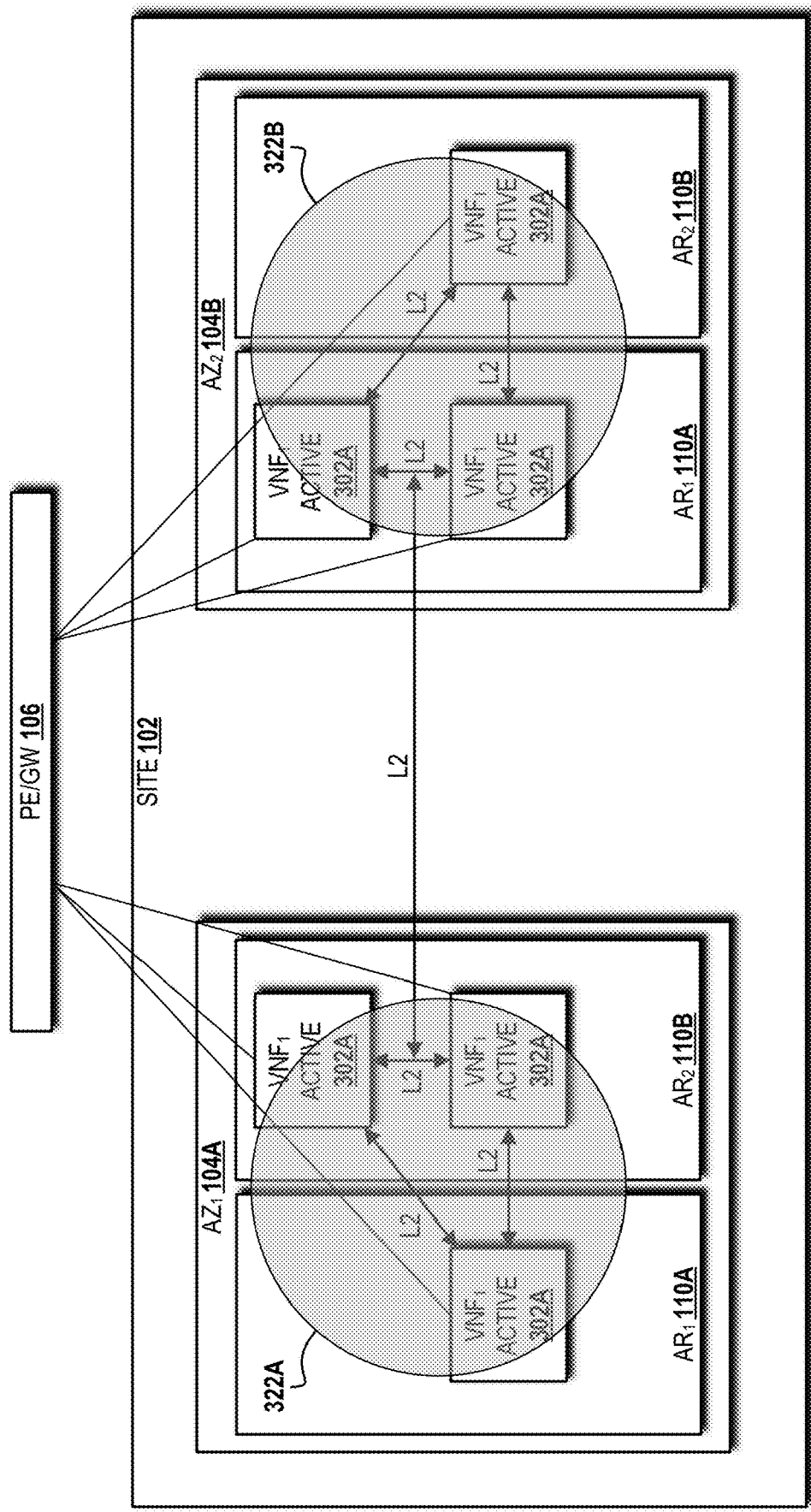

Referring now to FIGS. 3F-3G, a VNF configured in an example active-passive distribution model (FIG. 3F) within the site 102 will be compared to a VNF in an example cluster distribution model (FIG. 3F) within the site 102. The example active-passive distribution model shown in FIG. 3F illustrates the site 102, including the $AZ_1$ 104A and the $AZ_2$ 104B, each having instances of the $AR_1$ 110A and the $AR_2$ 110B. The $AR_1$ 110A in the $AZ_1$ 104A includes a first active VNF ("$VNF_1$-ACTIVE") 302A and a second active VNF ("$VNF_2$-ACTIVE") 302B. The $VNF_2$-ACTIVE 302B is communicatively connected via an L2 connection to a second passive VNF ("$VNF_2$-PASSIVE") 304B in the $AR_2$ 110B of the $AZ_1$ 104A. The $VNF_1$-ACTIVE 302A is communicatively connected via an L2 connection to a first passive VNF ("$VNF_1$-PASSIVE") 304A in the $AR_2$ 110B of the $AZ_2$ 104B. The $AR_1$ 110A of the $AZ_2$ 104B also includes a duplicate of the $VNF_2$-ACTIVE 302B along with a third active VNF ("$VNF_3$-ACTIVE") 302C. The $VNF_2$-ACTIVE 302B in the $AR_1$ 110A of the $AZ_2$ 104B is communicatively connected via an L2 connection to a $VNF_2$-PASSIVE 304B in the $AR_2$ 110B of the $AZ_2$ 104B. The $VNF_3$-ACTIVE 302C in the $AR_1$ 110A of the $AZ_2$ 104B is communicatively connected via an L2 connection to a third passive VNF ("$VNF_3$-PASSIVE") 304C in the $AR_2$ 110B of the $AZ_2$ 104B.

Most telecommunications carrier grade physical network functions have 1+1 redundancy for high availability. The concepts and technologies disclosed herein for the cloud computing environment 100 are able to achieve high availability and high utilization on par with these physical network functions using VNFs 302/304. In the example illustrated in FIG. 3F, if the $AZ_1$ 104A availability is 99%, the $AZ_2$ 104B availability is 99%, and the standalone $AZ_1$ 104A and $AZ_2$ 104B are not telecommunications carrier grade, then: the availability of the $VNF_1$ 302A/304A is 99.99% and the utilization of the $VNF_1$ 302A/304A is 50%; the availability of the $VNF_2$ 302B/304B is 99.99% and the utilization of the $VNF_2$ 302B/304B is 25%; and the availability of the $VNF_3$ 302C/304C is 99% and the utilization of the $VNF_3$ 302C/304C is 50%. The availability and utilization of the $VNF_1$ 302A/304A is in line with telecommunications carrier requirements. This results in significant Capex and Opex savings. The availability of the $VNF_2$ 302B/304B is in line with telecommunications carrier requirements, but utilization is below the requirement, resulting in significant Capex and Opex costs. The availability of the $VNF_3$ 302C/304C is below the requirement, but the utilization is in line with telecommunications carrier requirements, also resulting in significant Capex and Opex costs.

The example cluster distribution model shown in FIG. 3G illustrates the site 102, including the $AZ_1$ 104A and the $AZ_2$ 104B, each having instances of the $AR_1$ 110A and the $AR_2$ 110B. The $AR_1$ 110A in the $AZ_1$ 104A includes an instance of the $VNF_1$-ACTIVE 302A. The $AR_2$ 110B in the $AZ_1$ 104A includes two duplicate instances of the $VNF_1$-ACTIVE 302A. These three instances of the $VNF_1$-ACTIVE 302A are communicatively connected via L2 connections, thereby forming a cluster 322A. The $AR_1$ 110A in the $AZ_2$ 104B includes two instances of the $VNF_1$-ACTIVE 302A. The $AR_{2110}$B in the $AZ_2$ 104B includes one instance of the $VNF_1$-ACTIVE 302A. These three instances of the $VNF_1$-ACTIVE 302A are communicatively connected via L2 connections, thereby forming a cluster 322B. The clusters 322A, 322B are communicatively connected via L2 connection.

The concepts and technologies disclosed herein for the cloud computing environment 100 are able to achieve high availability and high utilization on par with physical network functions with cluster redundancy for high availability. In the example illustrated in FIG. 3G, if the $AZ_1$ 104A availability is 99%, the $AZ_2$ 104B availability is 99%, and the standalone $AZ_1$ 104A and $AZ_2$ 104B is not telecommunications carrier grade, then, with the cluster 322A set as active and the cluster 322B set as passive (stand-by), the availability is 99.99% and the utilization is 50%. The cluster availability and utilization are in line with telecommunications carrier requirements. This results in significant Capex and Opex savings.

Figure 4:
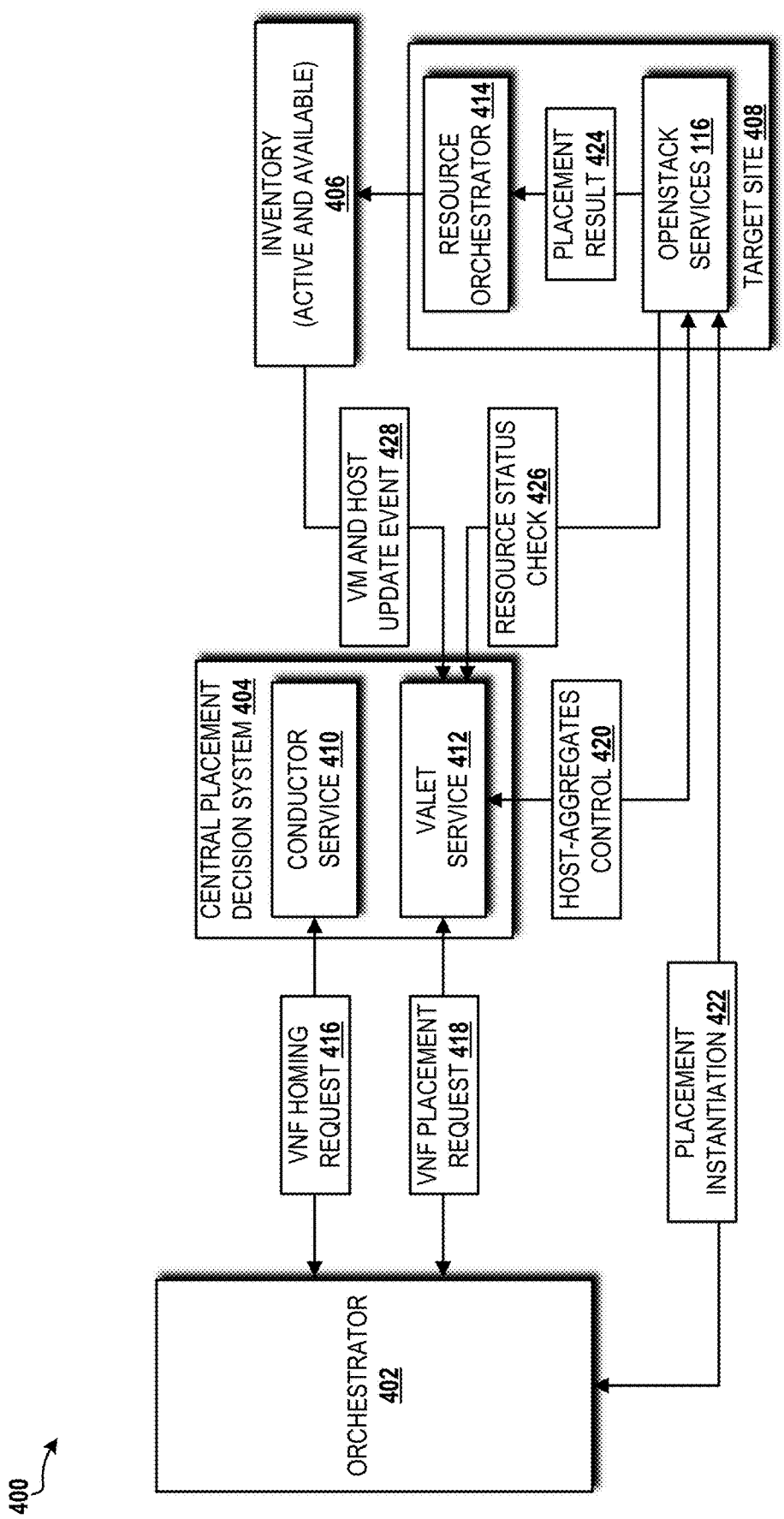
FIG. 4 is a block diagram illustrating an end-to-end work flow for virtual network function ("VNF") placement within the cloud computing environment, according to an illustrative embodiment.

Referring now to FIG. 4, a block diagram illustrating an end-to-end work flow 400 for VNF placement within the cloud computing environment 100 will be described, according to an illustrative embodiment. The illustrated embodiment shows an orchestrator 402, a central placement decision system 404, an inventory for active and available resources ("inventory") 406, and a target site 408 (e.g., one of the sites 102 described herein above).

The orchestrator 402 generates and sends a VNF homing request 416 to a conductor service 410 provided by the central placement decision system 404. The conductor service 410 performs a capacity check for each candidate site of the sites 102. The site 102 having capacity needed to accommodate the VNF homing request 416 is selected by the conductor service 410 as the target site 408. The conductor service 410 responds to the orchestrator 402 by identifying the target site 408 to which VNFs should be homed.

The orchestrator 402 then generates and sends a VNF placement request 418, including an OPENSTACK Heat orchestration template ("HOT") (example shown in FIG. 5), to a valet service 412. The valet service 412 determines VNF placements and returns, to the orchestrator 402, the OPENSTACK HOT, including any modifications the valet service 412 made thereto. Based upon the placement decision, the valet service 412 schedules corresponding host-aggregates via OPENSTACK Nova REST APIs (generally shown as host-aggregates control 420) of the OPENSTACK services 116 in the target site 408.

The orchestrator 402 then instantiates VNF placements (generally shown as placement instantiation 422). In particular, the orchestrator 402 communicates with OPENSTACK Heat 127 to instantiate VMs (e.g., the VMs 130 best shown in FIG. 1C) and receives results. The orchestrator 402 will notice rollback and retrial with the valet service 412 if the results indicate the VNF placement failed, or will confirm if the placement is successful. The OPENSTACK services 116 in the target site 408 will notify a resource orchestrator 414 of the resources consumed. The resource orchestrator 414 reports this placement result 424 to the inventory 406, which can then update the active and available resources.

The orchestrator 402 creates new valet group declarations (i.e., valet affinity, diversity, and exclusivity groups), and updates the metadata associated therewith. The valet service 412 listens to OPENSTACK events (shown as VM and host update event 428) from the inventory 406. The valet service 412 also performs periodic resource status checks 426 of the target site 408 resources and caches via Nova REST APIs.

Figure 5:
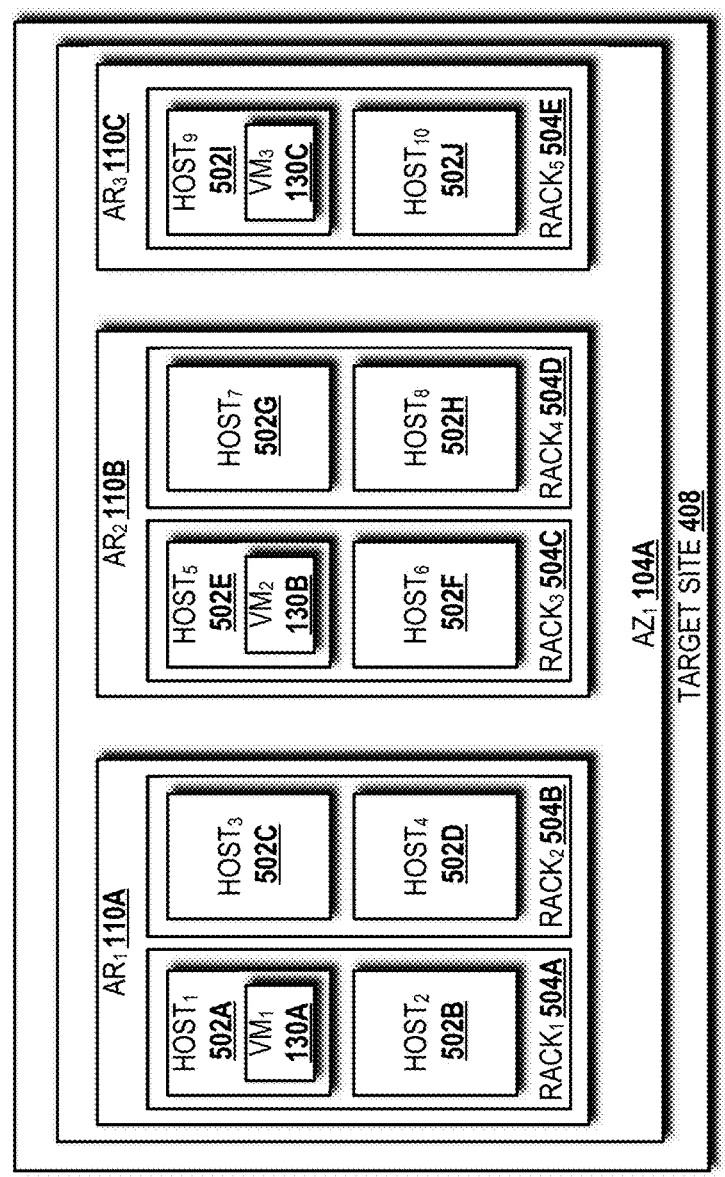
FIG. 5 is a block diagram illustrating an example OPEN-STACK Heat orchestration template used to configure a target site within the cloud computing environment, according to an illustrative embodiment.

Referring now to FIG. 5, a block diagram illustrating an example snippet of a HOT template (requested HOT snippet 500) sent by the orchestrator 402 to configure the target site 408 (shown in FIG. 4) within the cloud computing environment 100 will be described, according to an illustrative embodiment. The requested HOT snippet 500 shows the resources for each VM/VNF to be instantiated. The illustrated requested HOT snippet 500 provides resource definitions for three VMs 130—$VM_1$ 130A, $VM_2$ 130B, and $VM_3$ 130C—each of which are shown in the target site 408. In particular, the requested HOT snippet 500 defines the instance types and properties for each of the VMs 130 such that the $VM_1$ 130A is instantiated in a first host ("$HOST_1$") 502A of hosts 502A-502D in racks 504A-504B in the $AR_1$ 110A of the $AZ_1$ 104A; the $VM_2$ 130B is instantiated in a fifth host ("$HOST_5$") 502E of hosts 502E-502H in racks 504C-504D in the $AR_2$ 110B of the $AZ_1$ 104A; and the $VM_3$ 130C is instantiated in a ninth host ("$HOST_9$") 502I of hosts 502I-502J in rack 504E in the $AR_3$ 110C of the $AZ_1$ 104A. It should be noted that the "valet_availability_region" property in the requested HOT snippet 500 is a new property under OS::Nova::Server Type in the requested HOT snippet 500.

Figure 6A:
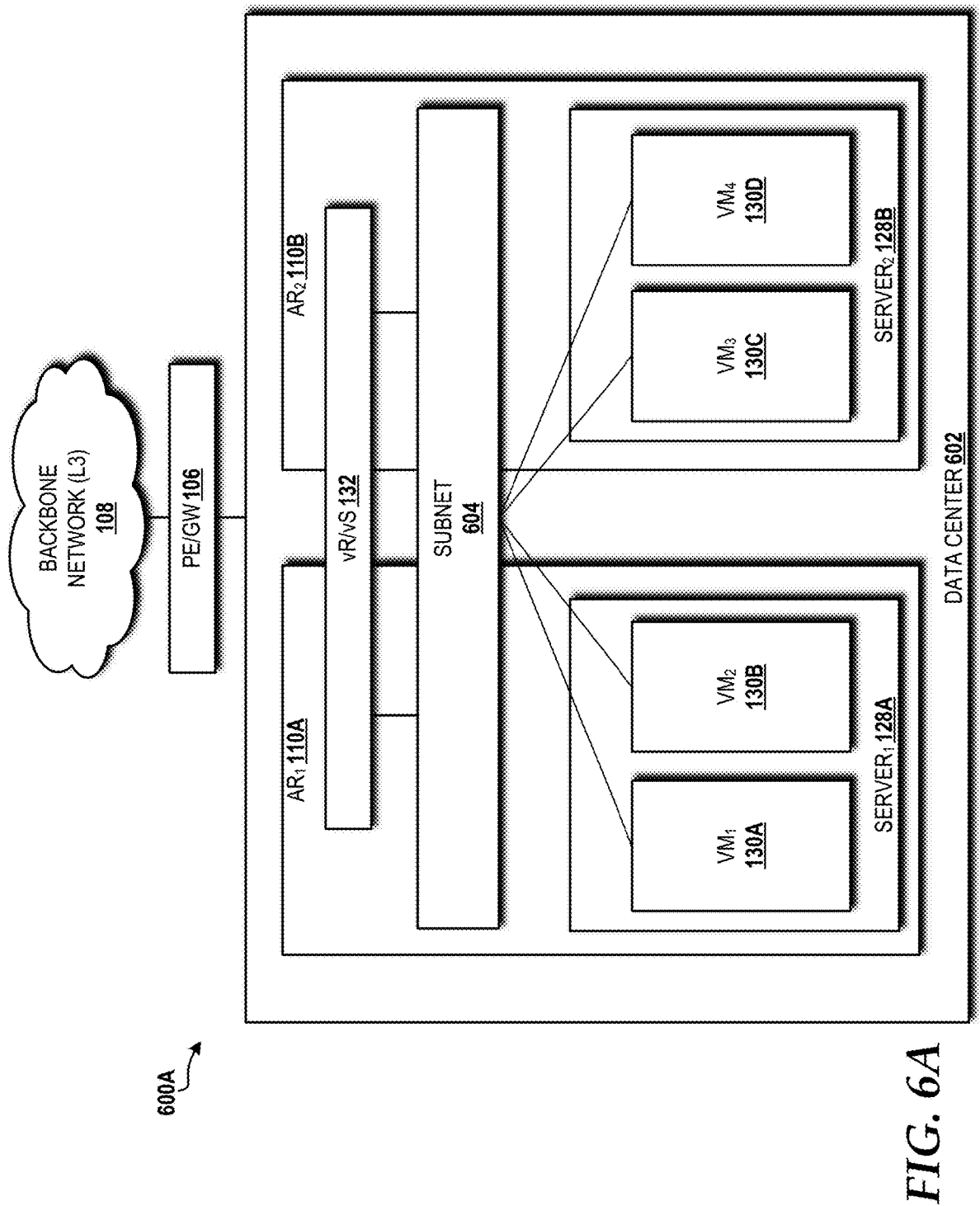
FIGS. 6A-6B are block diagrams illustrating an OPEN-STACK neutron networking framework for a data center with a multi-AR configuration, according to illustrative embodiments.
Figure 6B:
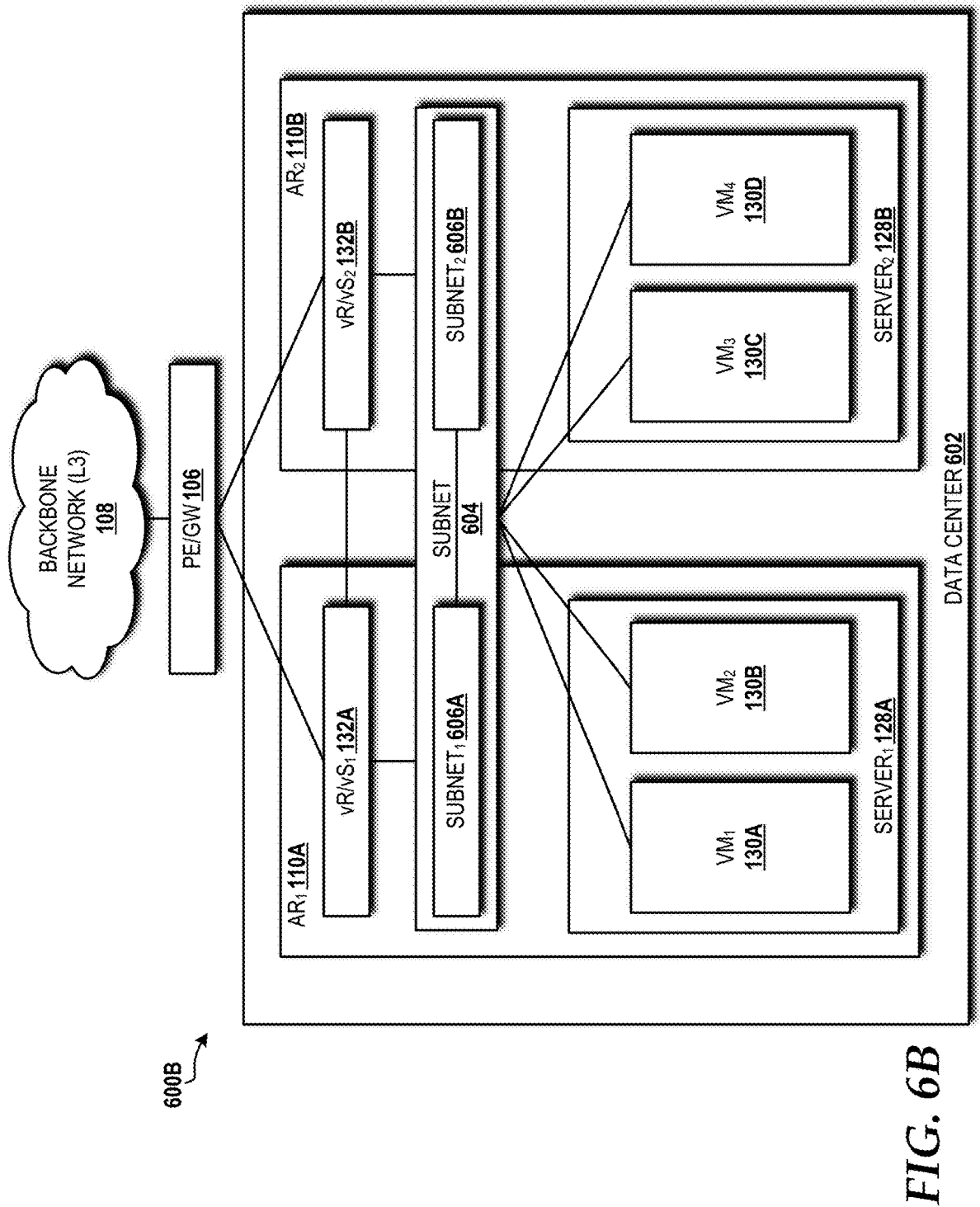

Referring now to FIGS. 6A-6B, embodiments of an OPENSTACK neutron networking framework ("networking framework") 600 for a data center 602 with a multi-AR configuration will be described, according to illustrative embodiments. Turning first to FIG. 6A, an embodiment of the networking framework 600A for the data center 602 will be described. The data center 602 includes the $AR_1$ 110A and the $AR_2$ 110B served by the vR/vS 132, which provides connectivity to the backbone network 108. The $AR_1$ 110A includes the $server_1$ 128A that hosts the $VM_1$ 130A and the $VM_2$ 130B. The $AR_2$ 110B includes the $server_2$ 128B that hosts the $VM_3$ 130C and the $VM_4$ 130D. The VMs 130A-130D are connected to the vR/vS 132 via a subnet 604 (e.g., the VNF L2 stretch network 300 shown in FIG. 3A) that spans both of the ARs 110. In case of single root input/output virtualization ("SR-IOV") implementations, a virtual Ethernet bridge ("VEB") in a network interface card ("NIC") can be used instead of the vR/vS 132 in the host kernel or in the user space.

Turning to FIG. 6B, another embodiment of the networking framework 600B for the data center 602 will be described. The data center 602 includes the $AR_1$ 110A served by the $vR/vS_1$ 132A and the $AR_2$ 110B served by the $vR/vS_2$ 132B. The $vR/vSs$ 132A, 132B provide connectivity to the backbone network 108 through the PE/GW 106. The $AR_1$ 110A includes the $server_1$ 128A that hosts the $VM_1$ 130A and the $VM_2$ 130B. The $AR_2$ 110B includes the $server_2$ 128B that hosts the $VM_3$ 130C and the $VM_4$ 130D. The VMs 130A-130B are connected to the $vR/vS_1$ 132A via a constituent subnet ("$subnet_1$") 606A (e.g., the $AR_1$ L2 network 306A shown in FIG. 3A). The VMs 130C-130D are connected to the $vR/vS_2$ 132B via another constituent subnet ("$subnet_2$") 606B (e.g., the $AR_2$ L2 network 306B shown in FIG. 3A).

Figure 7:
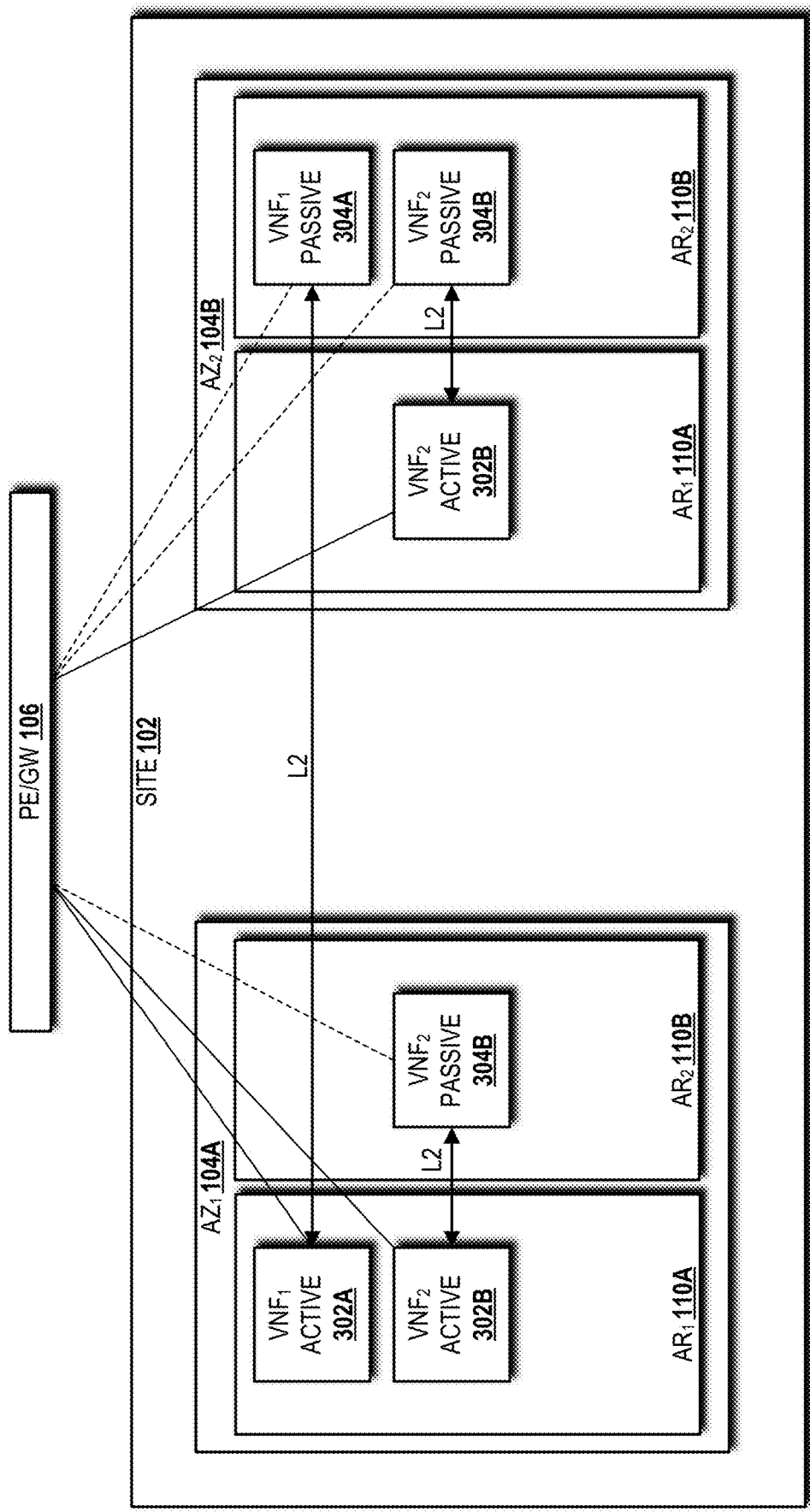
FIG. 7 is a block diagram illustrating an in-service AZ-by-AZ upgrade without impacting tenant services, according to an illustrative embodiment.

Referring now to FIG. 7, a block diagram illustrating an in-service sequential AR-by-AR upgrade within an AZ 104 followed by an AZ-by-AZ upgrade in a site 102 without impacting tenant services will be described, according to an illustrative embodiment. If each of the services in a site 102 are contained locally in an AZ 104, then the AZ-by-AZ upgrade in the site 102 alternatively can occur in parallel, but the AR-by-AR upgrade within an AZ is preferred to be sequential.

FIG. 7 illustrates the site 102, including the $AZ_1$ 104A and the $AZ_2$ 104B, each having instances of the $AR_1$ 110A and the $AR_2$ 110B. The $AR_1$ 110A of the $AZ_1$ 104A includes the $VNF_1$-ACTIVE 302A and the $VNF_2$-ACTIVE 302B. The second $VNF_2$-ACTIVE 302B is communicatively connected via an L2 connection to the $VNF_2$-PASSIVE 304B in the $AR_2$ 110B of the $AZ_1$ 104A. The $VNF_1$-ACTIVE 302A in the $AR_1$ 110A of the $AZ_1$ 104A is communicatively connected via an L2 connection to $VNF_1$-PASSIVE 304A in the $AR_2$ 110B of the $AZ_2$ 104B. The $AR_2$ 110B of the $AZ_2$ 104B also includes a duplicate of the $VNF_2$-PASSIVE 304B that is communicatively connected via an L2 connection to a duplicate instance of the $VNF_2$-ACTIVE 302B in the $AR_1$ 110A of the $AZ_2$ 104B. To perform an OPENSTACK and/or VNF upgrade from an N version to an N+1 version, the $AZ_1$ 104A is set to active mode while the $AZ_2$ 104B is set to maintenance mode and upgraded. After the $AZ_2$ 104B is upgraded, the $AZ_2$ 104B returns to active mode and the $AZ_1$ 104A is set to maintenance mode and upgraded.

Figure 8A:
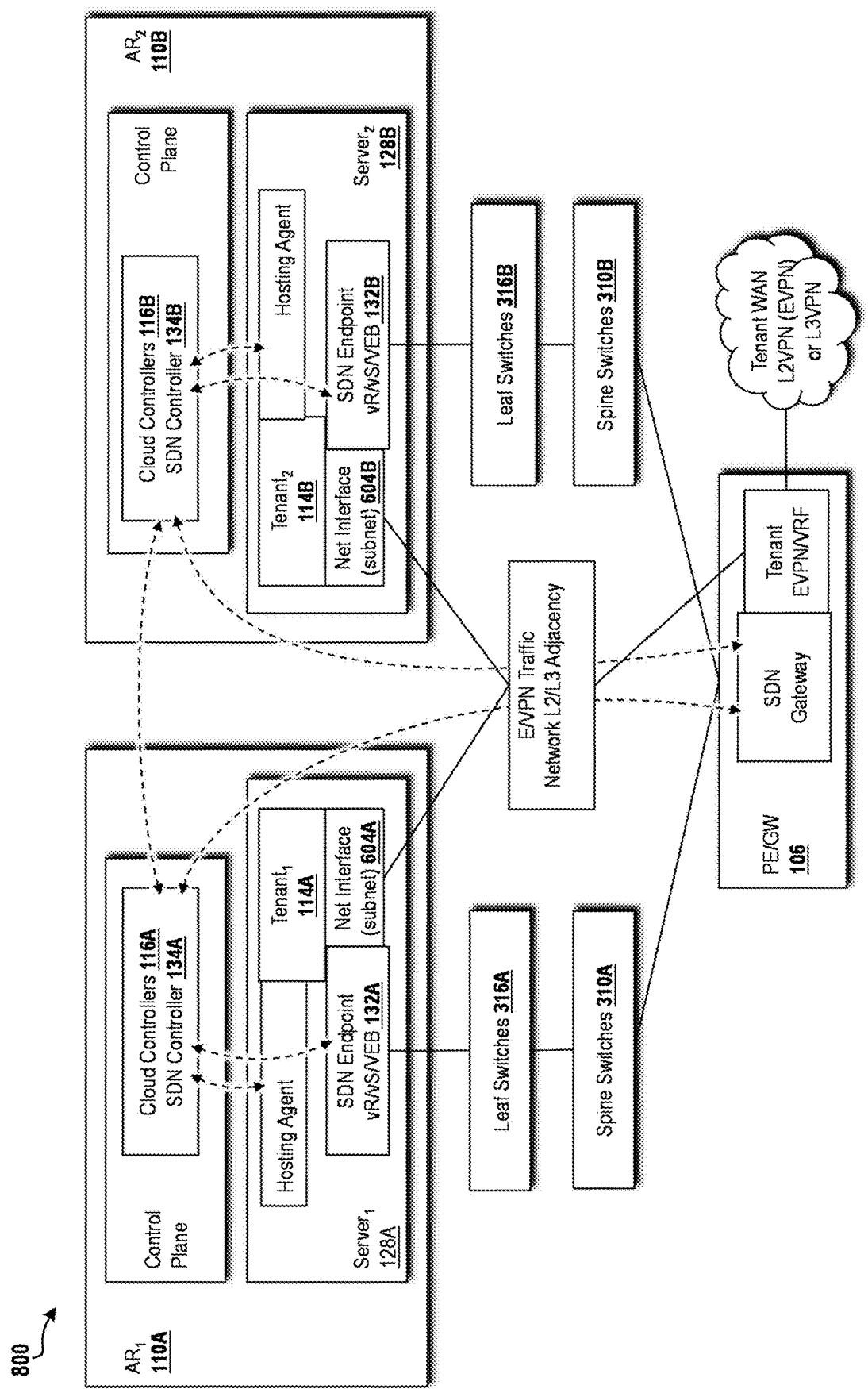
FIG. 8A is a block diagram illustrating layer 2 adjacency between tenant VNFs hosted in different ARs, according to an illustrative embodiment.

Turning now to FIG. 8A, a block diagram illustrating layer 2 adjacency between tenant VNFs hosted in different ARs (generally shown as 800) will be described, according to an illustrative embodiment. In the illustrated embodiment, the tenants 114A, 114B are hosted as VMs, Containers, or other virtual hosting solution on the servers 128A, 128B, respectively. The servers 128A, 128B are associated with the ARs 110A, 110B, respectively. The control functions—that is, the cloud controllers 116A, 116B and the SDN controllers 134A, 134B—for the ARs 110A, 110B manage the virtual hosting and the virtual network configuration details for the tenants 114A, 114B via the hosting agents and the SDN endpoints (e.g., the vR/vSs 132A, 132B). The SDN endpoints can be implemented by vRouter, vSwitch, Virtual Ethernet Bridge, or other network client in the servers 128A, 128B. The WAN network of the tenants 114A, 114B is configured as EVPN or VRF at the PE/GW 106. An SDN Gateway at the PE/GW 106 also is managed by the SDN controllers 134A, 134B. Network adjacency between the tenants 114A, 114B and the WAN edge can be L2 and/or L3. Tenant network traffic can be forwarded over the leaf switches 316A, 316B and the spine switches 310A, 310B either as tagged or tunneled, depending on the specific SDN implementation model.

Figure 8B:
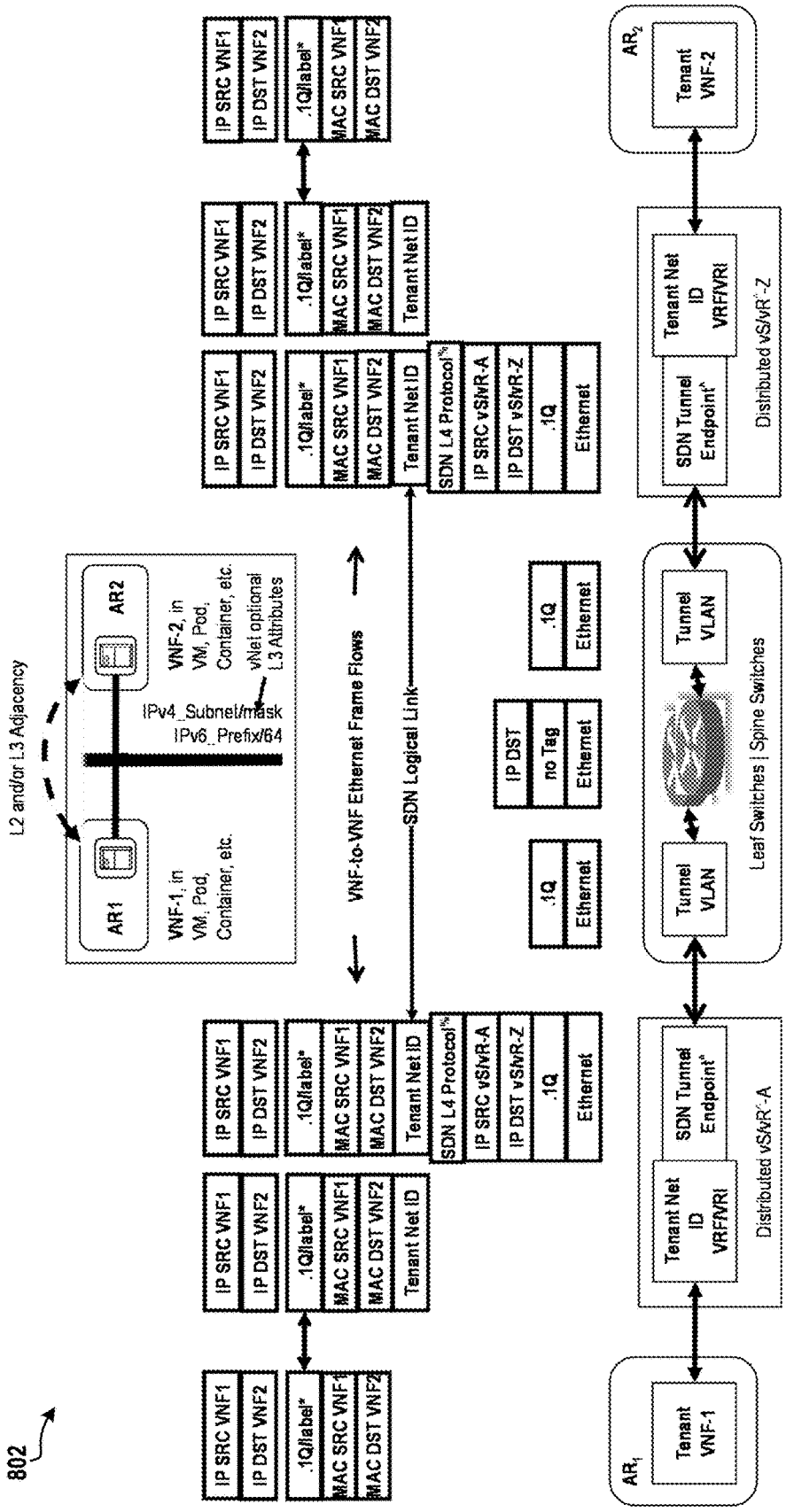
FIG. 8B is a block diagram illustrating a software-defined network ("SDN") link between VNFs in different ARs, according to an illustrative embodiment.

Turning now to FIG. 8B, a block diagram illustrating an SDN link between VNFs in different ARs (generally shown as 802) will be described, according to an illustrative embodiment. The illustrated embodiment shows the L2-L4 protocol fields that are managed over an SDN logical link between the tenants and across the network cloud leaf and spine infrastructure when the SDN endpoints are in the servers. The SDN endpoints forward tenant traffic as tagged or tunneled, depending on the specific SDN implementation model. The SDN logical link provides L2 and/or L3 network adjacency between the tenants hosted in different ARs.

Figure 8C:
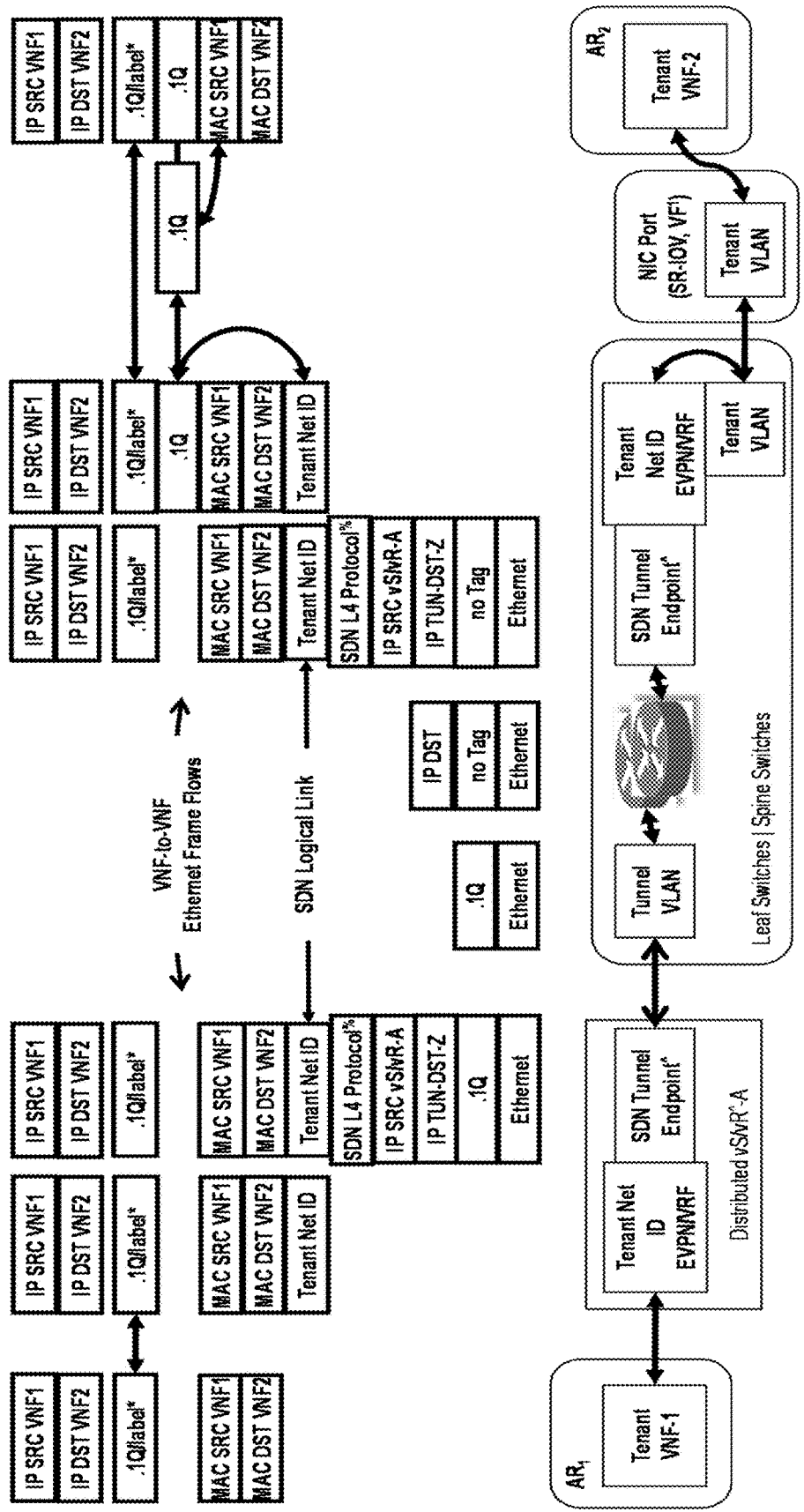
FIG. 8C is a block diagram illustrating an SDN link between VNFs in different ARs in a partial single root input/output virtualization ("SR-IOV") implementation, according to an illustrative embodiment.

Turning now to FIG. 8C, a block diagram illustrating an SDN link between VNFs in different ARs in a partial SR-IOV implementation (generally shown at 804) will be described, according to an illustrative embodiment. The illustrated embodiment shows how the L2-L4 protocol fields are managed over an SDN logical link between the tenants and across the network cloud leaf and spine infrastructure when one SDN endpoint is in a server and the other endpoint is at a leaf switch, such as when the SDN model uses SR-IOV at one server. The SDN endpoints forward tenant traffic as tagged or tunneled, depending on the specific SDN implementation model. The SDN logical link provides L2 and/or L3 network adjacency between the tenants hosted in different ARs.

Figure 8D:
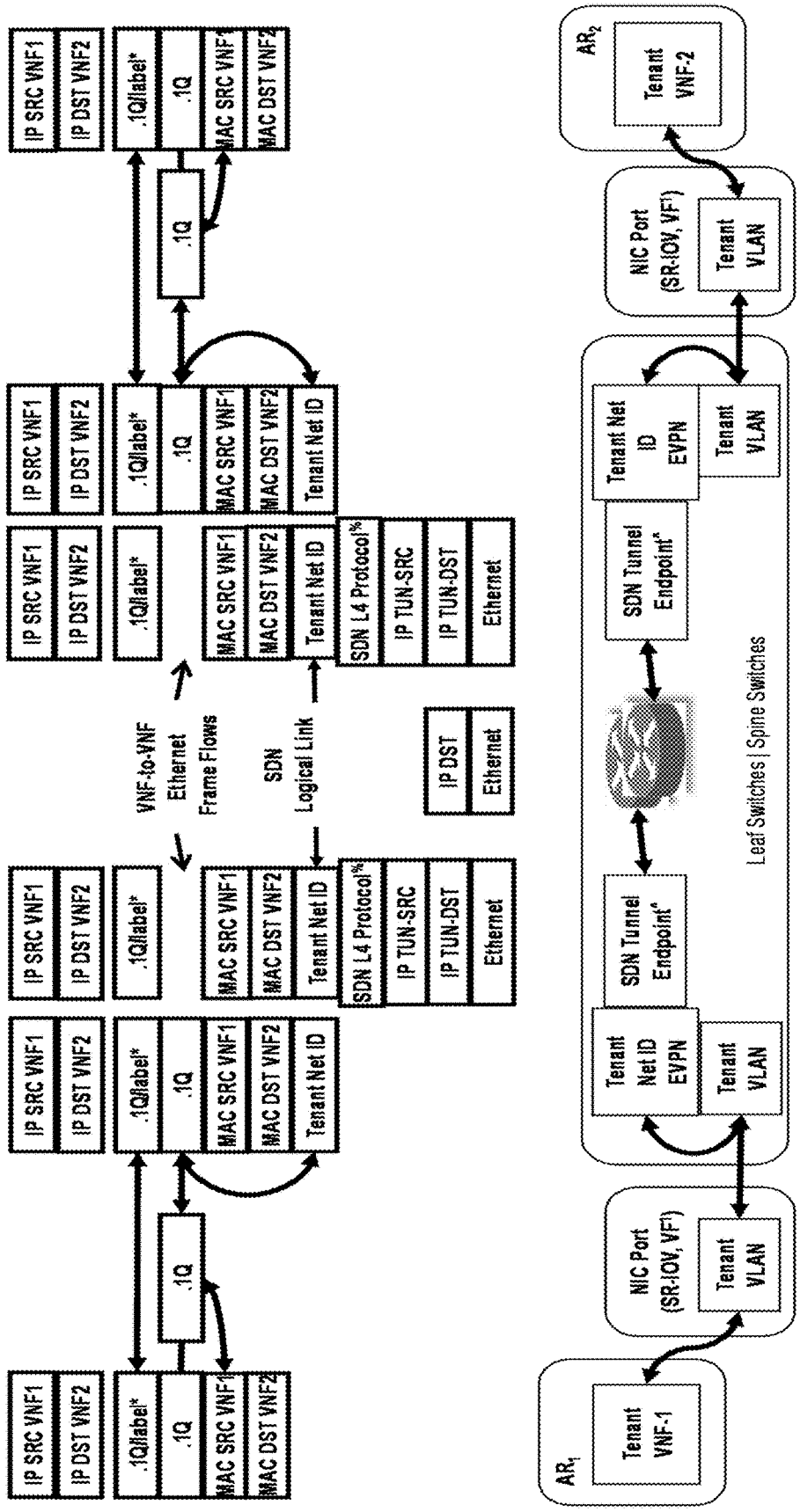
FIG. 8D is a block diagram illustrating an SDN link between VNFs in different ARs in a full SR-IOV implementation, according to an illustrative embodiment.

Turning now to FIG. 8D, a block diagram illustrating an SDN link between VNFs in different ARs in a full SR-IOV implementation (generally shown at 806) will be described, according to an illustrative embodiment. The illustrated embodiment shows how the L2-L4 protocol fields are managed over an SDN logical link between the tenants and across the network cloud leaf and spine infrastructure when both SDN endpoints are at leaf switches, such as when the SDN model uses SR-IOV at both servers. The SDN endpoints forward tenant traffic as tagged or tunneled, depending on the specific SDN implementation model. The SDN logical link provides L2 and/or L3 network adjacency between the tenants hosted in different ARs.

Figure 9A:
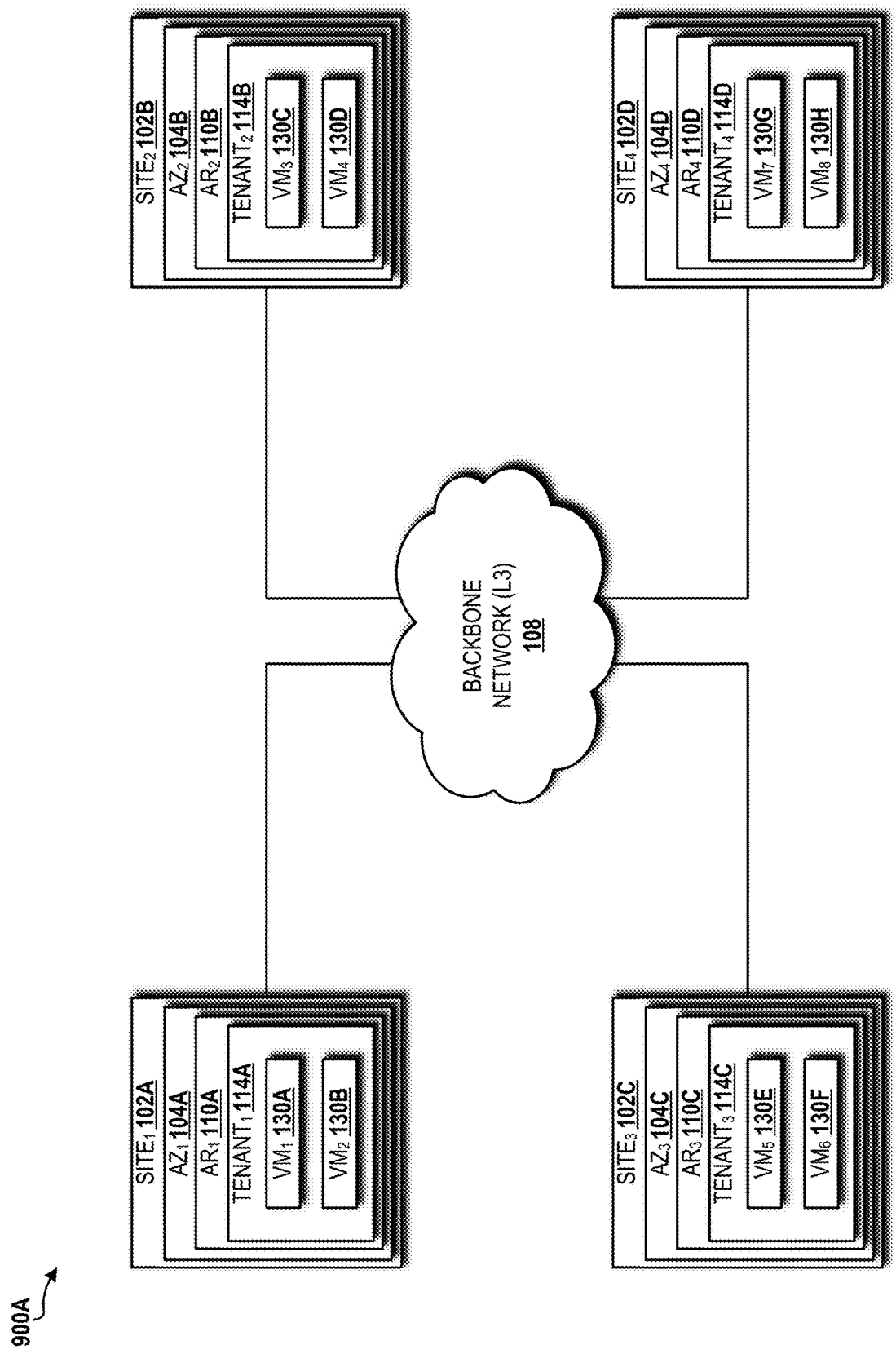
FIG. 9A is a block diagram illustrating a 4-site model of application placement within the cloud computing environment that results in 25% resource utilization.

Referring now to FIG. 9A, a block diagram illustrating a 4-site model 900A for configuring the cloud computing environment 100 to achieve 25% resource utilization will be described. FIG. 9A will be described using the numbering scheme established above for ease of explanation.

The illustrated 4-site model 900A includes sites 102A-102D, each communicatively connected via the backbone network 108. Each of the sites 102 includes one AZ 104. In particular, the $SITE_1$ 102A includes the $AZ_1$ 104A; the $SITE_2$ 102B includes the $AZ_2$ 104B; the $SITE_3$ 102C includes the $AZ_3$ 104C; and the $site_4$ 102D includes the $AZ_4$ 104D.

Each of the AZs 104 in the 4-site model 900A includes one AR 110. In particular, the $AZ_1$ 104A includes the $AR_1$ 110A; the $AZ_2$ 104B includes the $AR_2$ 110B; the $AZ_3$ 104C includes the $AR_3$ 110C; and the $AZ_4$ 104D includes the $AR_4$ 110D. Each of the ARs 110 can include a pool of tenant servers 114 (shown as "tenant 114"; single tenant server configurations are also contemplated) hosting one or more applications. In particular, the $AR_1$ 110A includes the $tenant_1$ 114A; the $AR_2$ 110B includes the $tenant_2$ 114B; the $AR_3$ 110C includes $tenant_3$ 114C; and the $AR_4$ 110D includes the $tenant_4$ 114D.

Each of the tenants 114 can host one or more of the VMs 130. In particular, the $tenant_1$ 114A hosts the $VM_1$ 130A and the $VM_2$ 130B; the $tenant_2$ 114B hosts the $VM_3$ 130C and the $VM_4$ 130D; the $tenant_3$ 114C hosts the $VM_5$ 130E and the $VM_6$ 130F; and the $tenant_4$ 114D hosts the $VM_7$ 130G and the $VM_8$ 130H. Each pair of VMs 130 (e.g., the $VM_1$ 130A and the $VM_2$ 130B) can be implemented in an active-passive configuration.

The 4-site model 900A provides a total 8 million ("8M") quota in the four sites 102A-102D, with each site 102 providing a 2M quota with 1M each for active and passive (i.e., stand-by) VMs 130 to achieve 25% utilization. Site availability for the 4-site model 900A is three 9s (99.9%); AR 110 (LCP) availability also is three 9s; VM availability for a given active-passive VM pair is three 9s; site avail-ability is five 9s; and the storage design of the 4-site model 900A provides a single point of failure. Each site 102 in the 4-site model 900A has only one AR 110. Each of the sites 102 carries 500 thousand ("500K") active traffic for a total traffic of 2M in the four sites 102A-102D. An upgrade or failure within any of the sites 102A-102D results in the upgraded/failed site going out-of-service. Thus, when one of the sites 102A-102D (e.g., $SITE_1$ 102A is upgraded during a planned event) and another one of the sites 102A-102D (e.g., $SITE_2$ 102B) fails as a result of an unplanned event (e.g., a dramatic increase in traffic), the remaining two sites 102C, 102D are required to manage the 2M traffic.

Figure 9B:
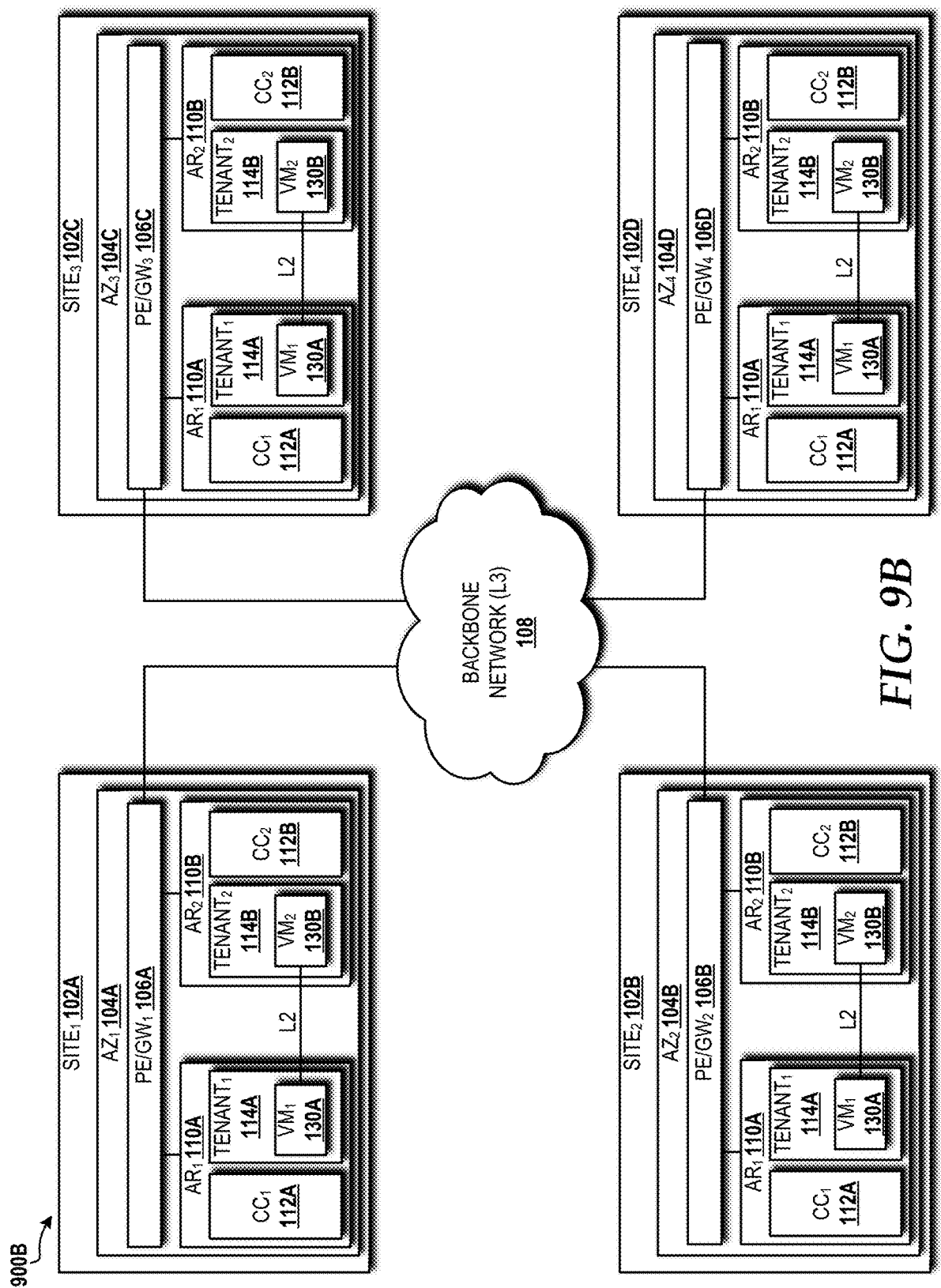
FIG. 9B is a block diagram illustrating a novel 4-site model of application placement within the cloud computing environment that results in 37.5% resource utilization, according to an illustrative embodiment.

Turning now to FIG. 9B, a block diagram illustrating a novel 4-site model 900B for configuring the cloud computing environment 100 to achieve 50% resource utilization will be described, according to an illustrative embodiment. The illustrated novel 4-site model 900B includes the sites 102A-102D communicatively connected via the backbone network 108. In the illustrated novel 4-site model 900B, each of the sites 102 includes one AZ 104 defined by the PE/GW 106 service demarcation that provides connectivity between resources in the AZ 104 and the backbone network 108. In particular, the $site_1$ 102A includes the $AZ_1$ 104A defined by the $PE/GW_1$ 106A; the $SITE_2$ 102B includes $AZ_2$ 104B defined by the $PE/GW_2$ 106B; the $SITE_3$ 102C includes the $AZ_3$ 104C defined by the $PE/GW_3$ 106C; and the $SITE_4$ 102D includes the $AZ_4$ 104D defined by the $PE/GW_4$ 106D.

Each of the AZs 104A-104D in the illustrated novel 4-site model 900B includes two ARs 110. In particular, the $AZ_1$ 104A includes the $AR_1$ 110A and the $AR_2$ 110B; the $AZ_2$ 104B includes duplicate instances of the $AR_1$ 110A and the $AR_2$ 110B; the $AZ_3$ 104C includes duplicate instances of the $AR_1$ 110A and the $AR_2$ 110B; and the $AZ_4$ 104D includes duplicate instances of the $AR_1$ 110A and the $AR_2$ 110B. Each of the ARs 110 in the illustrated novel 4-site model 900B includes one CC 112 and one tenant 114. In particular, the $AR_1$ 110A includes the $CC_1$ 112A and the $tenant_1$ 114A, and the $AR_2$ 110B includes the $CC_2$ 112B and the $tenant_2$ 114B. Each of the tenants 114 in the illustrated novel 4-site model 900B includes one VM 130. In particular, the $tenant_1$ 114A includes the $VM_1$ 130A, and the $tenant_2$ 114B includes the $VM_2$ 130B. Each pair of the tenants 114A, 114B can communicate via an L2 connection.

The illustrated novel 4-site model 900B provides a total 8M quota in the four sites 102A-102D, with each site 102 providing a 2M quota with 1M quota for active VMs 130 in one AR 110 (e.g., the $AR_1$ 110A) and 1M quota for standby VMs 130 in the other AR 110 (e.g., the $AR_2$ 110B) to achieve 50% utilization (a 25% utilization improvement over the 4-site model 900A described above with reference FIG. 9A). Site 102 availability for the novel 4-site model 900B is five 9s (99.999%), AR (LCP) 110 availability is three 9s, VM 130 availability in an active-passive VM pair (e.g., $VM_1$ 130A, $VM_2$ 130B) is five 9s, site 102 network availability is five 9s, and storage design provides redundancy with via the L2 connections between the VMs 130A, 130B. Each of the sites 102 carries 750K active traffic for a total traffic of 3M in the four sites 102A-102D (instead of 2M in the 4 sites 102A-102D of the 4-site model 900A described above with reference to FIG. 9A). An upgrade or failure within any of the sites 102A-102D is managed locally. For example, if the $AR_1$ 110A is upgraded (or fails), the $AR_2$ 110B manages any redirected traffic. If any of the sites 102A-102D goes down, traffic is redirected to the remaining three sites 102 resulting in 3M traffic to be handled by these sites 102.

Figure 9C:
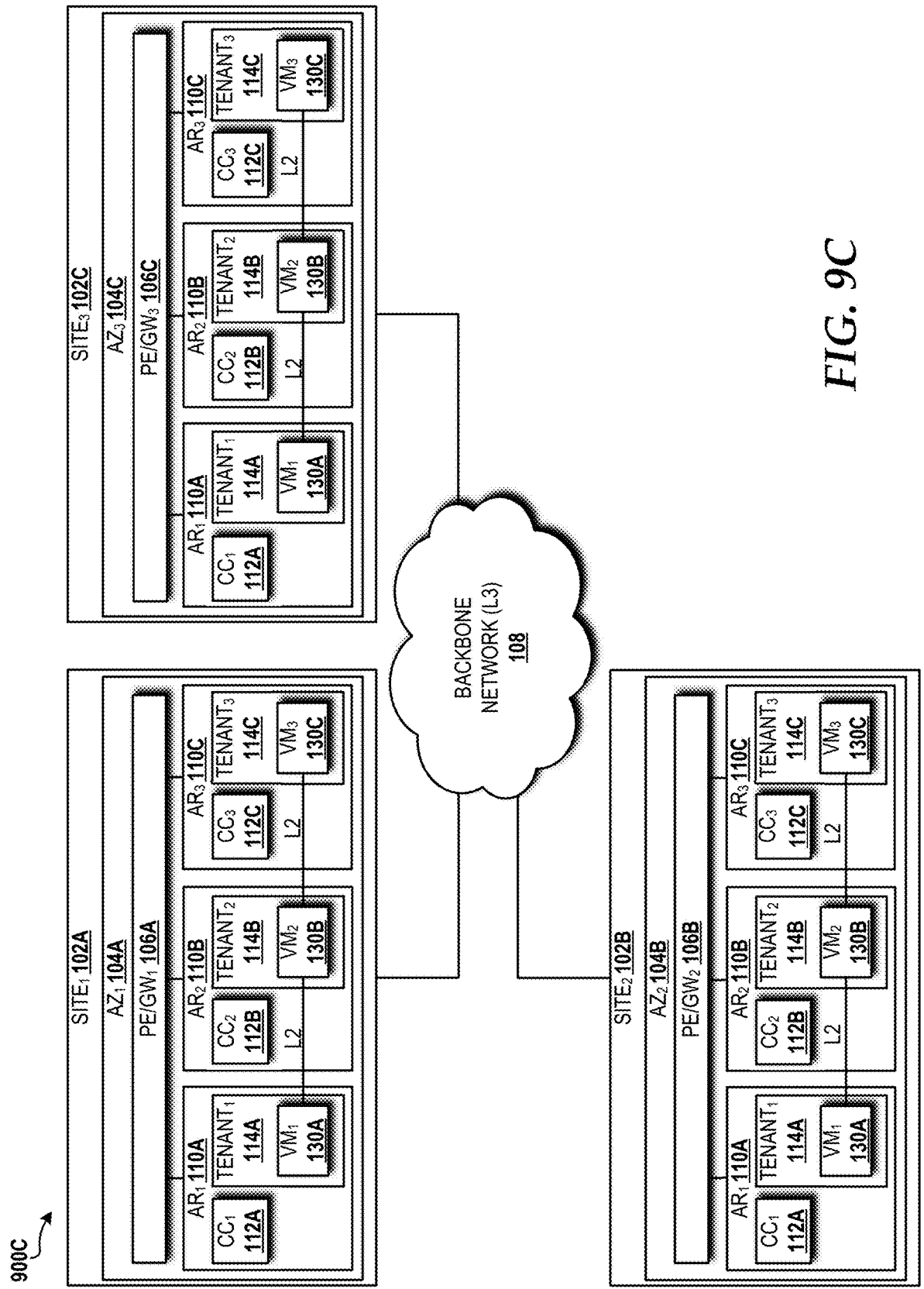
FIG. 9C is a block diagram illustrating a novel 3-site model of application placement the cloud computing environment that results in 66% resource utilization, according to an illustrative embodiment.

Turning now to FIG. 9C, a block diagram illustrating a novel 3-site model 900C for application placement in the cloud computing environment 100 to achieve 66% resource utilization will be described, according to an illustrative embodiment. The illustrated novel 3-site model 900C includes the sites 102A-102C communicatively connected via the backbone network 108. In the illustrated novel 3-site model 900C, each of the sites 102A-102C includes one AZ 104 defined by the PE/GW 106 service demarcation that provides connectivity between resources in the AZ 104 and the backbone network 108. In particular, the site$_1$ 102A includes the AZ$_1$ 104A defined by the PE/GW$_1$ 106A; the SITE$_2$ 102B includes AZ$_2$ 104B defined by the PE/GW$_2$ 106B; and the SITES 102C includes the AZ$_3$ 104C defined by the PE/GW$_3$ 106C.

Each of the AZs 104A-104C in the illustrated novel 3-site model 900C includes three ARs 110A-110C. In particular, the AZ$_1$ 104A includes the AR$_1$ 110A, the AR$_2$ 110B, and the AR$_3$ 110C; the AZ$_2$ 104B includes a duplicate of the AR$_1$ 110A, the AR$_2$ 110B, and the AR$_3$ 110C; and the AZ$_3$ 104C includes a duplicate of the AR$_1$ 110A, the AR$_2$ 110B, and the AR$_3$ 110C. Each of the ARs 110 in the illustrated novel 3-site model 900C includes one CC 112 and one tenant 114. In particular, the AR$_1$ 110A includes the CC$_1$ 112A and the tenant$_1$ 114A, the AR$_2$ 110B includes the CC$_2$ 112B and the tenant$_2$ 114B, and the AR$_3$ 110C includes the CC$_3$ 112C and the tenant$_3$ 114C. Each of the tenants 114 in the illustrated novel 3-site model 900C includes one VM 130. In particular, the tenant$_1$ 114A includes the VM$_1$ 130A, the tenant$_2$ 114B includes the VM$_2$ 130B, and the tenant$_3$ 114C includes the VM$_3$ 130C. The tenants 114A-114C can communicate via an L2 connection.

The illustrated novel 3-site model 900C provides a total 3M quota in the three sites 102A-102C, with each site 102 providing a 330K quota for each AR 110 for a total quota of 1M per site 102. Also, each site 102 carries only 666K traffic, thus providing 66% utilization (a 41% improvement over the 4-site model 900A; see FIG. 9A. Site 102 availability for the novel 3-site model 900C is five 9s (99.999%), AR 110 (LCP) availability is three 9s, VM 130 availability in an active-passive VM 130 pair is five 9s, site 102 network availability is five 9s, and storage design provides redundancy with via the L2 connections between the VMs 130A-130C. An upgrade or failure within any of the sites 102 is managed locally within the site 102. For example, if an upgrade or failure occurs in the AR$_1$ 110A, traffic is redirected to the other ARs in that site 102 (e.g., the AR$_2$ 110B and the AR$_3$ 110C). If any of the sites 102 experiences a total failure, traffic is redirected to spare VMs 130 executing on the other two sites 102.

Figure 9D:
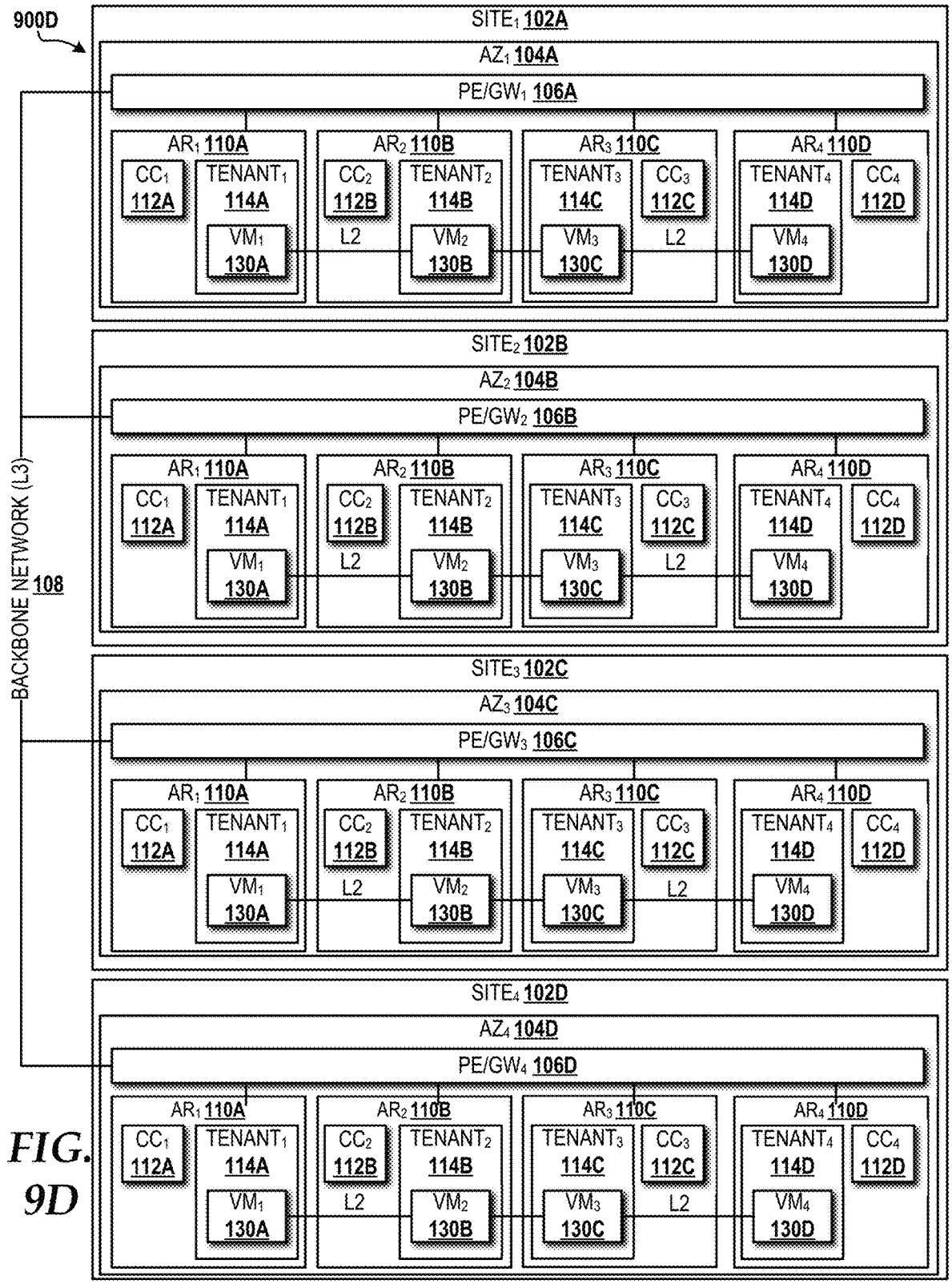
FIG. 9D is a block diagram illustrating another novel 4-site model of application placement within the cloud computing environment that results in 75% resource utilization, according to an illustrative embodiment.

Referring now to FIG. 9D, a block diagram illustrating a second novel 4-site model 900D for configuring a cloud computing environment, such as provided by the cloud computing environment 100, to achieve 75% resource utilization will be described, according to an illustrative embodiment. The illustrated novel 4-site model 900D includes the sites 102A-102D communicatively connected via the backbone network 108. In the illustrated novel 4-site model 900D, each of the sites 102A-102D includes one AZ 104 defined by a PE/GW 106 service demarcation that provides connectivity between resources in an AZ 104 and the backbone network 108. In particular, the site$_1$ 102A includes the AZ$_1$ 104A defined by the PE/GW$_1$ 106A; the SITE$_2$ 102B includes AZ$_2$ 104B defined by the PE/GW$_2$ 106B; the SITE$_3$ 102C includes the AZ$_3$ 104C defined by the PE/GW$_3$ 106C; and the SITE$_4$ 102D includes the AZ$_4$ 104D defined by the PE/GW$_4$ 106D.

Each of the AZs 104A-104D in the illustrated novel 4-site model 900D includes four ARs 110A-110D. In particular, the AZ$_1$ 104A includes the AR$_1$ 110A, the AR$_2$ 110B, the AR$_3$ 110C, and the AR$_4$ 110D; the AZ$_2$ 104B includes a duplicate of the AR$_1$ 110A, the AR$_2$ 110B, the AR$_3$ 110C, and the AR$_4$ 110D; the AZ$_3$ 104C includes a duplicate of the AR$_1$ 110A, the AR$_2$ 110B, the AR$_3$ 110C, and the AR$_4$ 110D; and the AZ$_4$ 104D includes a duplicate of the AR$_1$ 110A, the AR$_2$ 110B, the AR$_3$ 110C, and the AR$_4$ 110D. Each of the ARs 110 in the illustrated novel 4-site model 900D includes one CC 112 and one tenant 114. In particular, the AR$_1$ 110A includes the CC$_1$ 112A and the tenant$_1$ 114A, the AR$_2$ 110B includes the CC$_2$ 112B and the tenant$_2$ 114B, the AR$_3$ 110C includes the CC$_3$ 112C and the tenant$_3$ 114C, and the AR$_4$ 110D includes the CC$_4$ 112D and the tenant$_4$ 114D. Each of the tenants 114 in the illustrated novel 4-site model 900D includes one VM 130. In particular, the tenant$_1$ 114A includes the VM$_1$ 130A, the tenant$_2$ 114B includes the VM$_2$ 130B, the tenant$_3$ 114C includes the VM$_3$ 130C, and the tenant$_4$ 114D includes the VM$_4$ 130D. The tenants 114A-114D can communicate via an L2 connection.

The illustrated novel 4-site model 900D provides a total 3M quota in four sites 102A-102D, with each site 102 providing a 250K quota for each AR 110 for a total quota of 1M per site 102. Also, each site 102 carries only 750K traffic, thus providing 75% utilization (a 50% improvement over the 4-site model 900A shown in FIG. 9A). Site 102 availability for the novel 4-site model 900D is five 9s (99.999%), AR 110 (LCP) availability is three 9s, VM 130 availability in an active-passive VM pair is five 9s, site 102 network availability is five 9s, and storage design provides redundancy with via the L2 connections between the VMs 130A-130D. Each site 102 in the novel 4-site model 900D has a 250K active quota on each of the ARs 110A-110D. An upgrade or failure within any of the sites 102 is managed locally within the site 102. For example, if an upgrade or failure occurs in the AR$_1$ 110A, traffic is redirected to the other ARs 110 in that site 102 (e.g., the AR$_2$ 110B, the AR$_3$ 110C, and the AR$_4$ 110D). If any of the sites 102 experiences a total failure, traffic is redirected to spare VMs 130 executing on the other three sites 102.

Figure 10A:
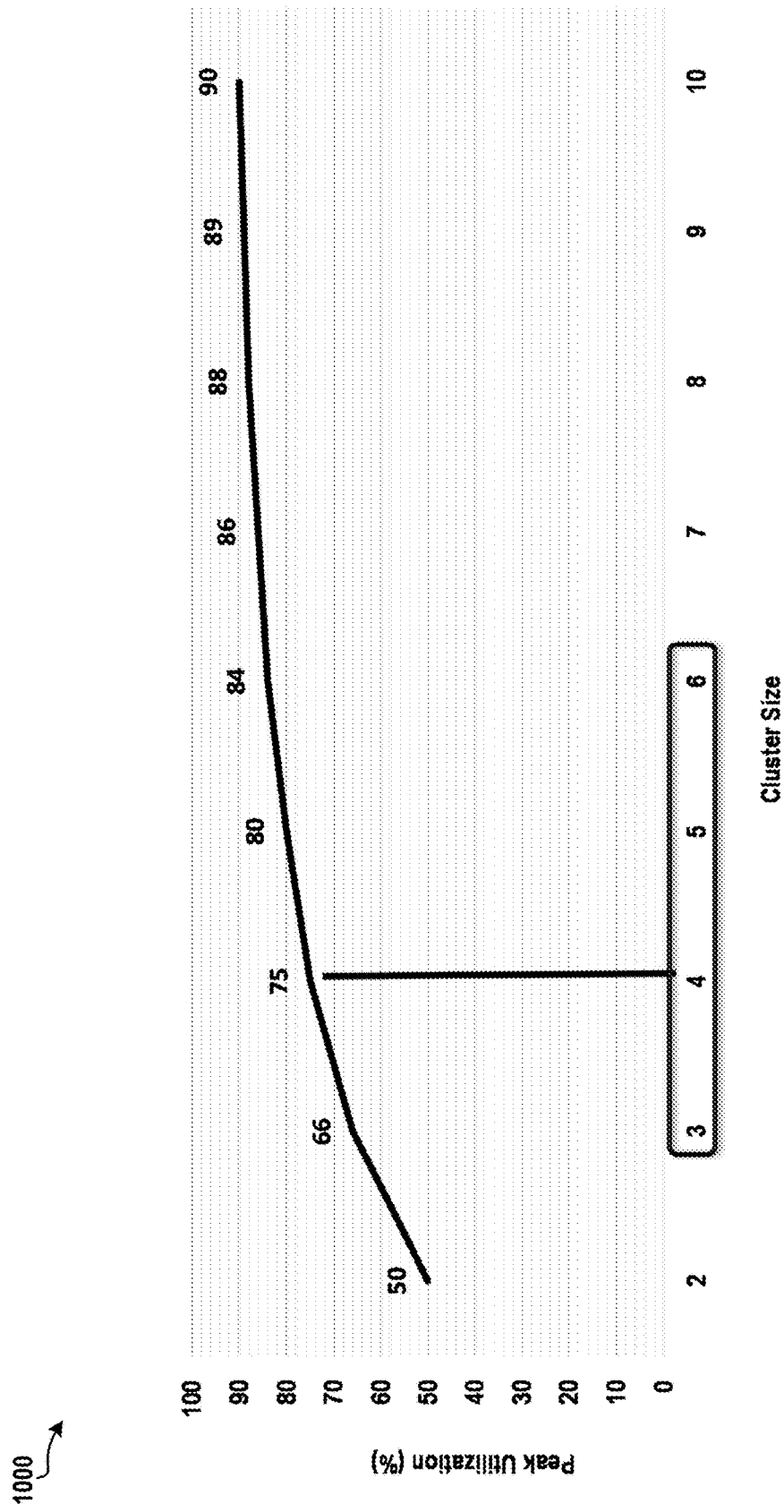
FIG. 10A is a graph illustrating an example cluster size versus cloud utilization, according to an illustrative embodiment.

Turning now to FIG. 10A, a graph 1000 illustrating an example cluster size (x-axis) versus peak cloud utilization (y-axis) will be described, according to an illustrative embodiment. The cluster size refers to the local cluster and geo-cluster size. Five 9s of VM availability can be achieved using a combination of VM clusters spread across ARs 110 within the AZ 104 for local redundancy and replication of this across sites 102 for geo-redundancy. For example, a cluster size of 4 in the graph 1000 refers to a local cluster of four VMs 130 and a geo-cluster of four such sites 102 (with four VMs 130 each; as shown in FIG. 9D). The peak cloud utilization refers to effective quota utilization. Bigger cluster sizes increase the complexity for implementation. Cluster sizes of 3 to 6 offer better utilization and manageable complexity. Since telecommunications networks are typically engineered for 80% peak utilization, cluster sizes of 4 or 5 are optimal.

Figure 10B:
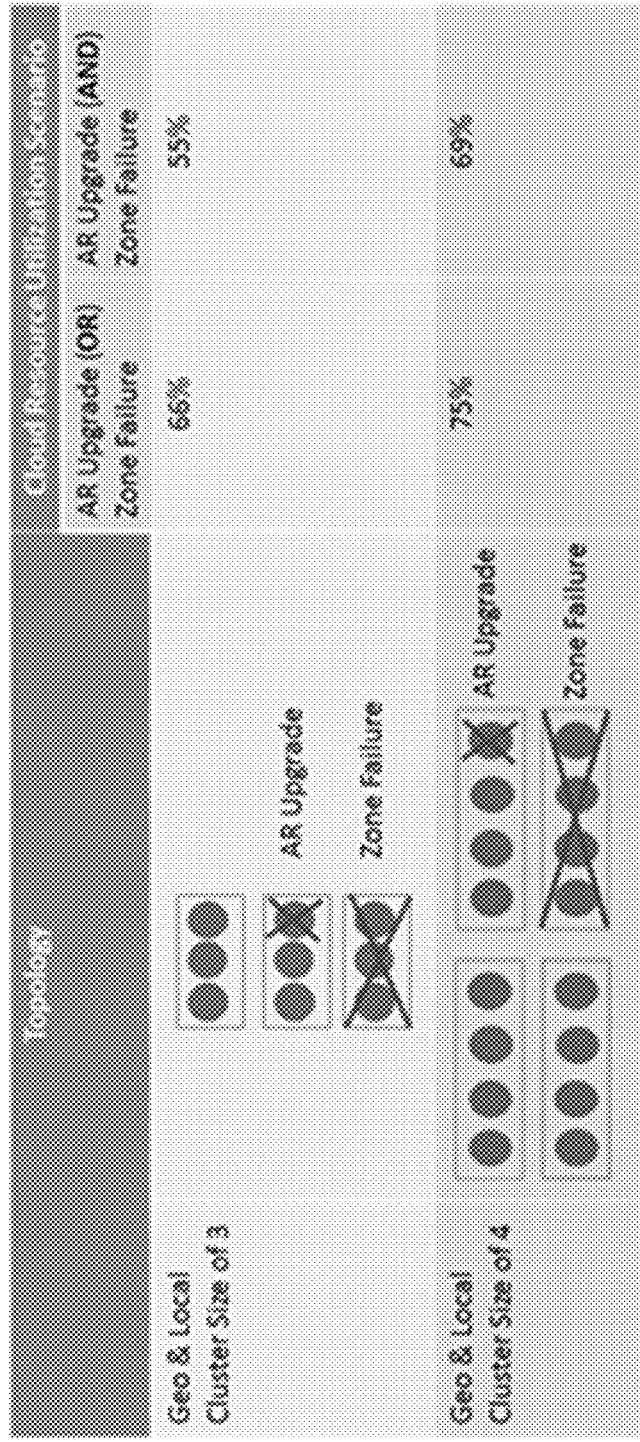
FIG. 10B is a table illustrating example topologies and cloud resource utilization scenarios, according to an illustrative embodiment.

Turning now to FIG. 10B, a table 1002 illustrating example topologies and cloud resource utilization scenarios will be described, according to an illustrative embodiment. Conditions for defining utilization can be modified based upon the site physical topology and application requirements. In such cases, cloud resource utilization might vary accordingly but still be maintained above 50% that is typical of physical infrastructures for real-time services.

Figure 11:
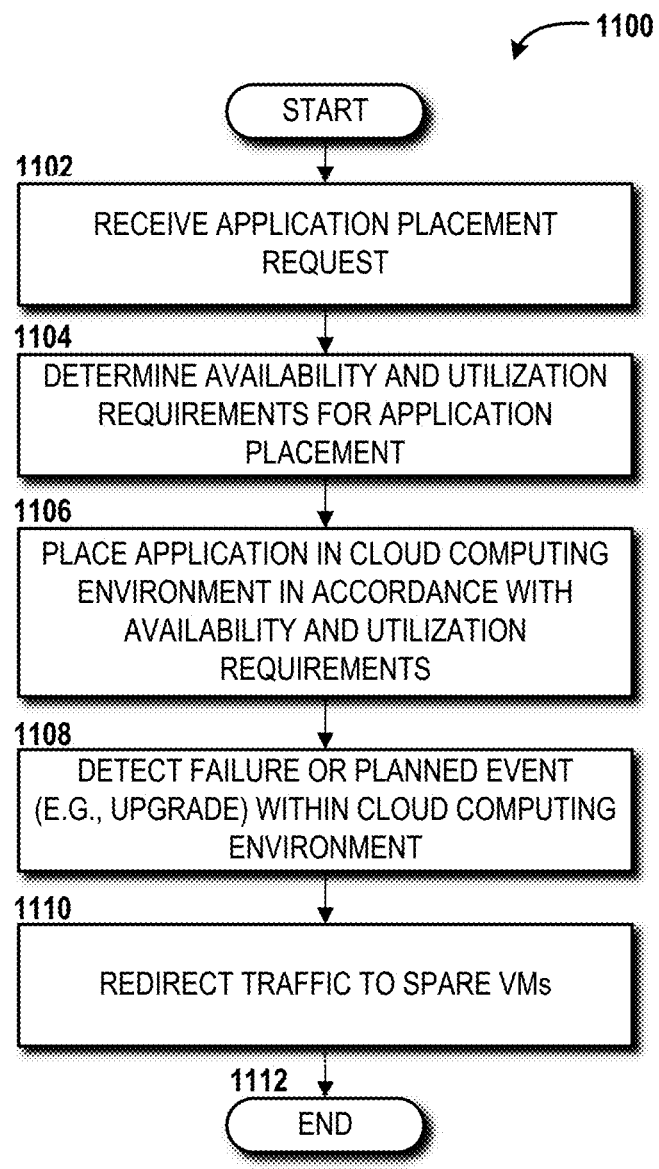
FIG. 11 is a flow diagram illustrating aspects of a method for application placement within the cloud computing environment, according to an illustrative embodiment.

Turning now to FIG. 11, aspects of a method 1100 for application placement within the cloud computing environment 100 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors to perform operations.

For purposes of illustrating and describing some of the concepts of the present disclosure, the methods disclosed herein are described as being performed, at least in part, by a VM placement system, such as the central placement decision system 404 (see FIG. 4) executing instructions to perform operations disclosed herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 1100 begins and proceeds to operation 1102, where the central placement decision system 404 receives an application placement request from a request queue. From operation 1102, the method 1100 proceeds to operation 1104, where the central placement decision system 404 determines the availability and utilization requirements for application placement.

In some embodiments, the application placement request specifies availability and/or utilization requirements to be met for placement of the requested application. In this manner, the application placement request can identify any of the novel high availability and high utilization models disclosed herein to be used for application placement.

In other embodiments, the central placement decision system 404 determines the availability and utilization requirements under which the application is to be placed. The central placement decision system 404 can make such determinations based upon one or more policies created by or for the provider of at least a portion of the cloud computing environment.

The central placement decision system 404 also can consider the status of one or more cloud resources in this determination. The status can include current utilization metrics for one or more of the cloud resources available from the cloud computing environment. The status can identify any cloud resource failures based upon output received from one or more monitoring systems of one or more servers (e.g., server 128). The status can include information regarding any planned event, including, for example, any planned upgrades to any of the sites 102, the AZs 104, the ARs 110, the servers 128 associated with at least a portion of the cloud computing environment. From operation 1104, the method 1100 proceeds to operation 1106, where the central placement decision system 404 places the requested application in the cloud computing environment in accordance with the availability and utilization requirements determined at operation 1104.

From operation 1106, the method 1100 proceeds to operation 1108, where the cloud computing environment detects a failure or a planned event. A failure can be detected via one or more monitoring systems that are deployed within the cloud computing environment at any level—that is, the site 102, AZ 104, AR 110, server 128, or VM 130 level. The planned event can be an upgrade or other modification to any hardware and/or software associated with at least a portion of the cloud computing environment in which the application was placed at operation 1106.

From operation 1108, the method 1100 proceeds to operation 1110, where the cloud computing environment, in response to the failure or planned event detected at operation 1106, redirects traffic associated with application from the portion of the cloud computing environment affected by the failure or planned event to one or more spare VMs operating elsewhere in the cloud computing environment. For example, the cloud computing environment can redirect traffic from one of the sites 102 to one or more other sites 102 that have available spare VMs 130. From operation 1110, the method 1100 proceeds to operation 1112, where the method 1100 ends.

Figure 12:
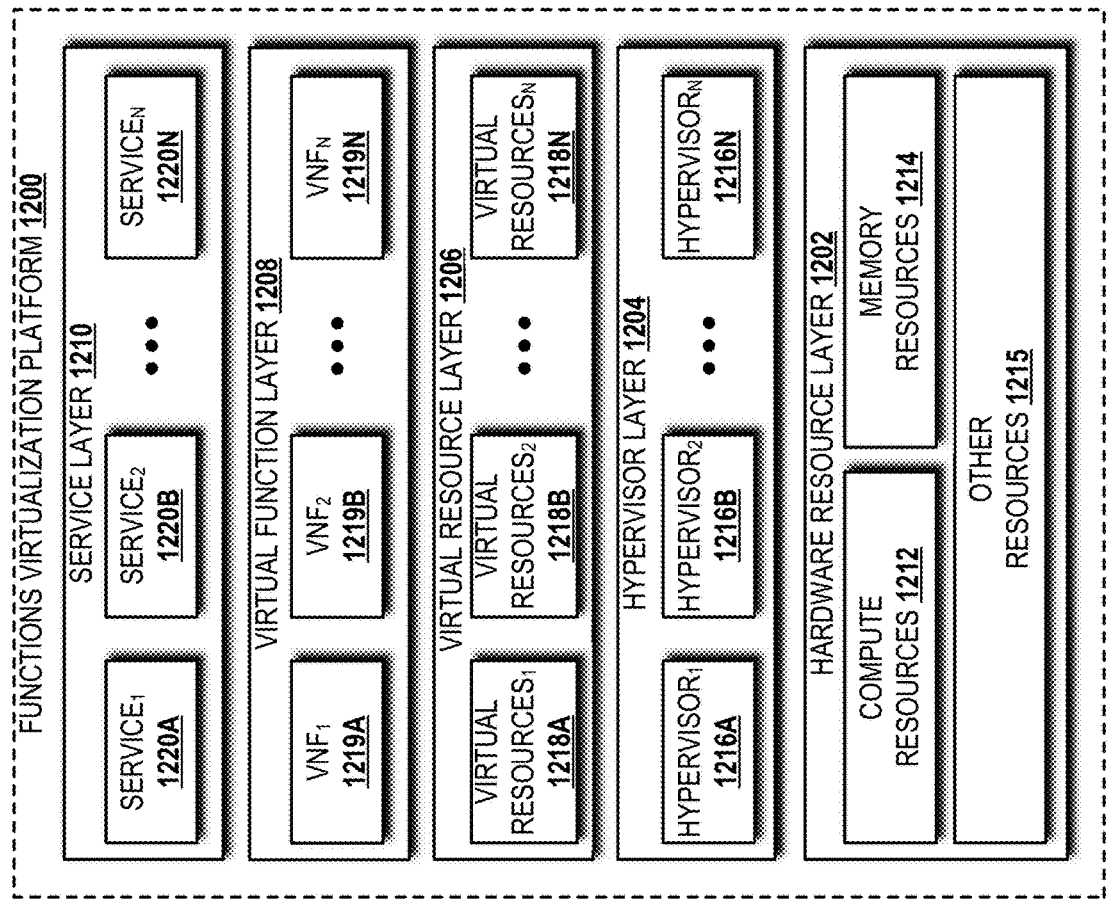
FIG. 12 is a block diagram illustrating a functions virtualization platform capable of implementing aspects of the cloud computing environment, according to an illustrative embodiment.

Turning now to FIG. 12, an illustrative functions virtualization platform 1200 capable of implementing aspects of the cloud computing environment 100 will be described, according to an illustrative embodiment. The functions virtualization platform 1200 includes a hardware resource layer 1202, a hypervisor layer 1204, a virtual resource layer 1206, a virtual function layer 1208, and a service layer 1210. While no connections are shown between the layers illustrated in FIG. 12, it should be understood that some, none, or all of the components illustrated in FIG. 12 can be configured to interact with one other to carry out various functions described herein. In some embodiments, the components are arranged so as to communicate via one or more networks. Thus, it should be understood that FIG. 12 and the remaining description are intended to provide a general understanding of a suitable environment in which various aspects of the embodiments described herein can be implemented and should not be construed as being limiting in any way.

The hardware resource layer 1202 provides hardware resources. In the illustrated embodiment, the hardware resource layer 1202 includes one or more compute resources 1212, one or more memory resources 1214, and one or more other resources 1215. The compute resource(s) 1212 can include one or more hardware components that perform computations to process data and/or to execute computer-executable instructions of one or more application programs, one or more operating systems, and/or other software. In particular, the compute resources 1212 can include one or more central processing units ("CPUs") configured with one or more processing cores. The compute resources 1212 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the compute resources 1212 can include one or more discrete GPUs. In some other embodiments, the compute resources 1212 can include CPU and GPU components that are configured in accordance with a co-processing CPU/GPU computing model, wherein the sequential part of an application executes on the CPU and the computationally-intensive part is accelerated by the GPU processing capabilities. The compute resources 1212 can include one or more system-on-chip ("SoC") components along with one or more other components, including, for example, one or more of the memory resources 1214, and/or one or more of the other resources 1215. In some embodiments, the compute resources 1212 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 1212 can be or can include one or more hardware components architected in accordance with an ARM architecture, available for license from ARM HOLDINGS of Cambridge, United Kingdom. Alternatively, the compute resources 1212 can be or can include one or more hardware components architected in accordance with an x86 architecture, such an architecture available from INTEL CORPORATION of Mountain View, Calif., and others. Those skilled in the art will appreciate the implementation of the compute resources 1212 can utilize various computation architectures, and as such, the compute resources 1212 should not be construed as being limited to any particular computation architecture or combination of computation architectures, including those explicitly disclosed herein.

The memory resource(s) 1214 can include one or more hardware components that perform storage/memory operations, including temporary or permanent storage operations. In some embodiments, the memory resource(s) 1214 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 1212.

The other resource(s) 1215 can include any other hardware resources that can be utilized by the compute resources (s) 1212 and/or the memory resource(s) 1214 to perform operations described herein. The other resource(s) 1215 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 1202 can be virtualized by one or more hypervisors 1216A-1216N (also known as "virtual machine monitors") operating within the hypervisor layer 1204 to create virtual resources that reside in the virtual resource layer 1206. The hypervisors 1216A-1216N can be or can include software, firmware, and/or hardware that alone or in combination with other software, firmware, and/or hardware, creates and manages virtual resources 1218A-1218N operating within the virtual resource layer 1206.

The virtual resources 1218A-1218N operating within the virtual resource layer 1206 can include abstractions of at least a portion of the compute resources 1212, the memory resources 1214, and/or the other resources 1215, or any combination thereof. In some embodiments, the abstractions can include one or more VMs, virtual volumes, virtual networks, and/or other virtualizes resources upon which one or more VNFs 1219A-1219N can be executed. The VNFs 1219A-1219N in the virtual function layer 1208 are constructed out of the virtual resources 1218A-1218N in the virtual resource layer 1206. In the illustrated example, the VNFs 1219A-1219N can provide, at least in part, one or more services 1220A-1220N in the service layer 1210.

Figure 13:
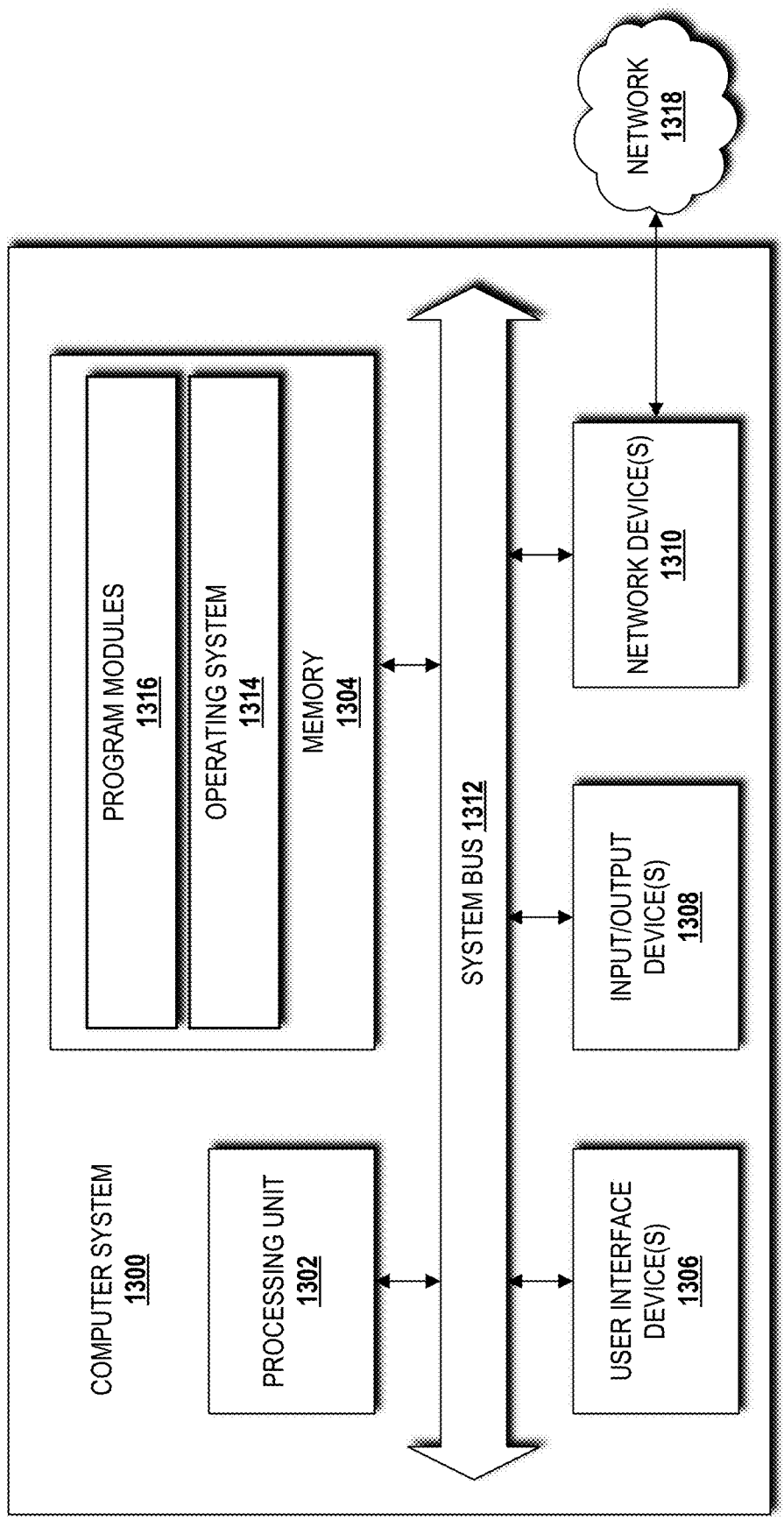
FIG. 13 is a block diagram illustrating an example computer system capable of implementing aspects of the embodiments presented herein.

FIG. 13 is a block diagram illustrating a computer system 1300 configured to provide the functionality in accordance with various embodiments of the concepts and technologies disclosed herein. It should be understood, however, that modification to the architecture may be made to facilitate certain interactions among elements described herein.

The computer system 1300 includes a processing unit 1302, a memory 1304, one or more user interface devices 1306, one or more input/output ("I/O") devices 1308, and one or more network devices 1310, each of which is operatively connected to a system bus 1312. The bus 1312 enables bi-directional communication between the processing unit 1302, the memory 1304, the user interface devices 1306, the I/O devices 1308, and the network devices 1310.

The processing unit 1302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 1304 communicates with the processing unit 1302 via the system bus 1312. In some embodiments, the memory 1304 is operatively connected to a memory controller (not shown) that enables communication with the processing unit 1302 via the system bus 1312. The illustrated memory 1304 includes an operating system 1314 and one or more program modules 1316. The operating system 1314 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1316 may include various software and/or program modules to perform the various operations described herein. The program modules 1316 and/or other programs can be embodied in computer-readable media containing instructions that, when executed by the processing unit 1302, perform various operations such as those described herein. According to embodiments, the program modules 1316 may be embodied in hardware, software, firmware, or any combination thereof.

By way of example, and not limitation, computer-readable media may include any available computer storage media or communication media that can be accessed by the computer system 1300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1300. In the claims, the phrase "computer storage medium" and variations thereof does not include waves or signals per se and/or communication media.

The user interface devices 1306 may include one or more devices with which a user accesses the computer system 1300. The user interface devices 1306 may include, but are not limited to, computers, servers, PDAs, cellular phones, or any suitable computing devices. The I/O devices 1308 enable a user to interface with the program modules 1316. In one embodiment, the I/O devices 1308 are operatively connected to an I/O controller (not shown) that enables communication with the processing unit 1302 via the system bus 1312. The I/O devices 1308 may include one or more input devices, such as, but not limited to, a keyboard, a mouse, or an electronic stylus. Further, the I/O devices 1308 may include one or more output devices, such as, but not limited to, a display screen or a printer.

The network devices 1310 enable the computer system 1300 to communicate with other networks or remote systems via a network 1318. Examples of the network devices 1310 include, but are not limited to, a modem, a radio frequency ("RF") or infrared ("IR") transceiver, a telephonic interface, a bridge, a router, or a network card. The network 1318 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1318 may be a wired network such as, but not limited to, a Wide Area Network ("WAN"), a wired Personal Area Network ("PAN"), or a wired Metropolitan Area Network ("MAN"). The network 1318 can be or can include the backbone network 108 and/or, one or more networks operating within the cloud computing environment 100.

Figure 14:
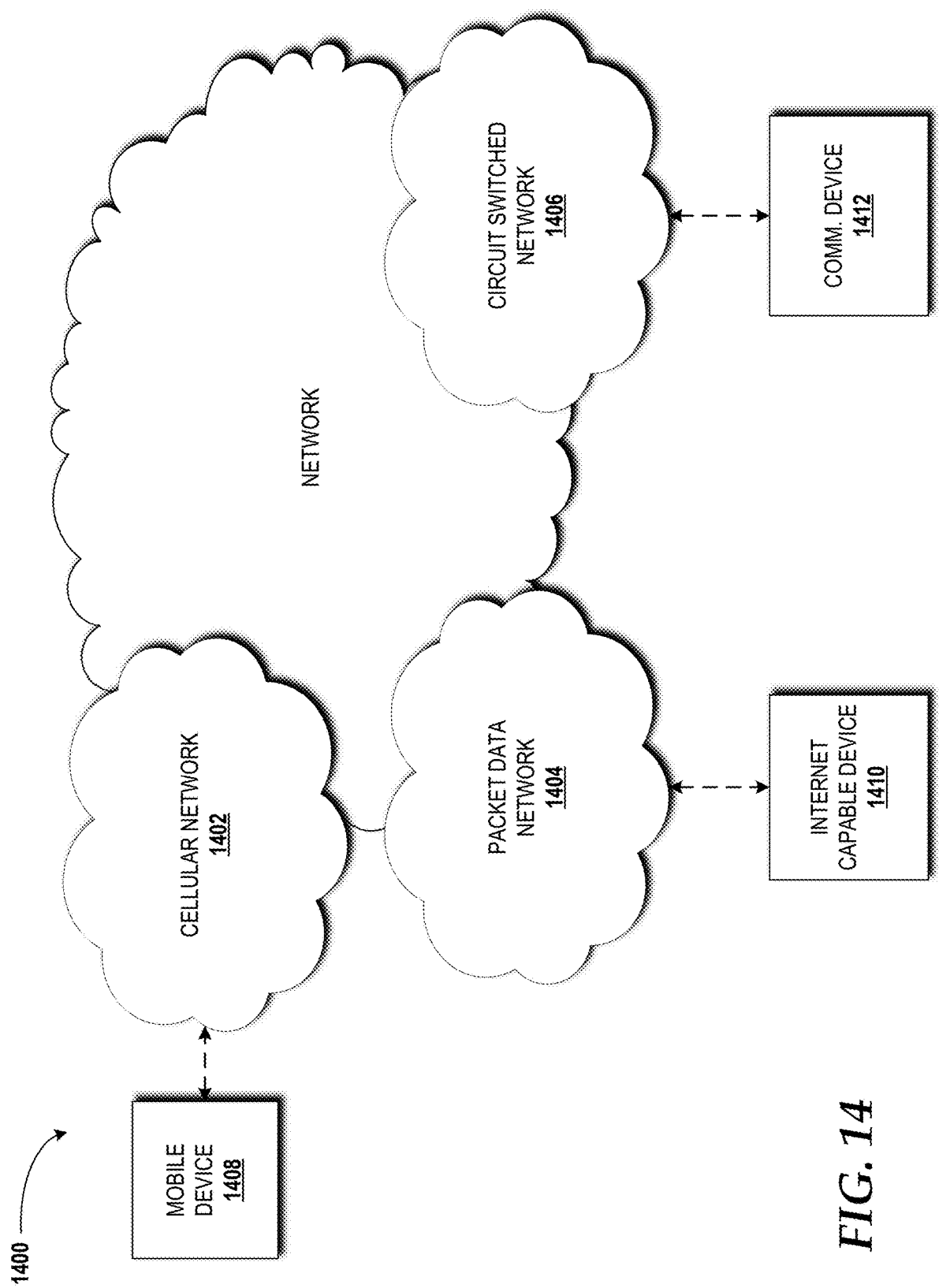
FIG. 14 is a diagram illustrating a network, according to an illustrative embodiment.

Turning now to FIG. 14, details of an overall network 1400 are illustrated, according to an illustrative embodiment. The overall network 1400 includes a cellular network 1402, a packet data network 1404, for example, the Internet, and a circuit switched network 1406, for example, a public switched telephone network ("PSTN"). The backbone network 108 can be provided as part of the overall network 1400 or integrated within one or more of the sub-networks encompassed thereby.

The cellular network 1402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1402 also includes radios and nodes for receiving and transmitting voice, data, and combinations thereof to and from radio transceivers, networks, the packet data network 1404, and the circuit switched network 1406.

A mobile communications device 1408, such as, for example, a cellular telephone, a user equipment, a mobile terminal, a PDA, a laptop computer, a handheld computer, and combinations thereof, can be operatively connected to the cellular network 1402. The cellular network 1402 can be configured as a 2G Global System for Mobile communications ("GSM") network and can provide data communications via General Packet Radio Service ("GPRS") and/or Enhanced Data rates for Global Evolution ("EDGE"). Additionally, or alternatively, the cellular network 1402 can be configured as a 3G Universal Mobile Telecommunications System ("UMTS") network and can provide data communications via the High-Speed Packet Access ("HSPA") protocol family, for example, High-Speed Downlink Packet Access ("HSDPA"), Enhanced Uplink ("EUL") (also referred to as High-Speed Uplink Packet Access "HSUPA"), and HSPA+. The cellular network 1402 also is compatible with 4G mobile communications standards such as Long-Term Evolution ("LTE"), or the like, as well as evolved and future mobile standards.

The packet data network 1404 includes various devices, for example, servers, computers, databases, and other devices in communication with one another, as is generally known. The packet data network 1404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. The circuit switched network 1406 includes various hardware and software for providing circuit switched communications. The circuit switched network 1406 may include, or may be, what is often referred to as a plain old telephone system ("POTS"). The functionality of a circuit switched network 1406 or other circuit-switched network are generally known and will not be described herein in detail.

The illustrated cellular network 1402 is shown in communication with the packet data network 1404 and a circuit switched network 1406, though it should be appreciated that this is not necessarily the case. One or more Internet-capable devices 1410, a PC, a laptop, a portable device, or another suitable device, can communicate with one or more cellular networks 1402, and devices connected thereto, through the packet data network 1404. It also should be appreciated that the Internet-capable device 1410 can communicate with the packet data network 1404 through the circuit switched network 1406, the cellular network 1402, and/or via other networks (not illustrated).

As illustrated, a communications device 1412, for example, a telephone, facsimile machine, modem, computer, or the like, can be in communication with the circuit switched network 1406, and therethrough to the packet data network 1404 and/or the cellular network 1402. It should be appreciated that the communications device 1412 can be an Internet-capable device, and can be substantially similar to the Internet-capable device 1410. In the specification, the network is used to refer broadly to any combination of the networks 1402, 1404, 1406 shown in FIG. 14.

Figure 15:
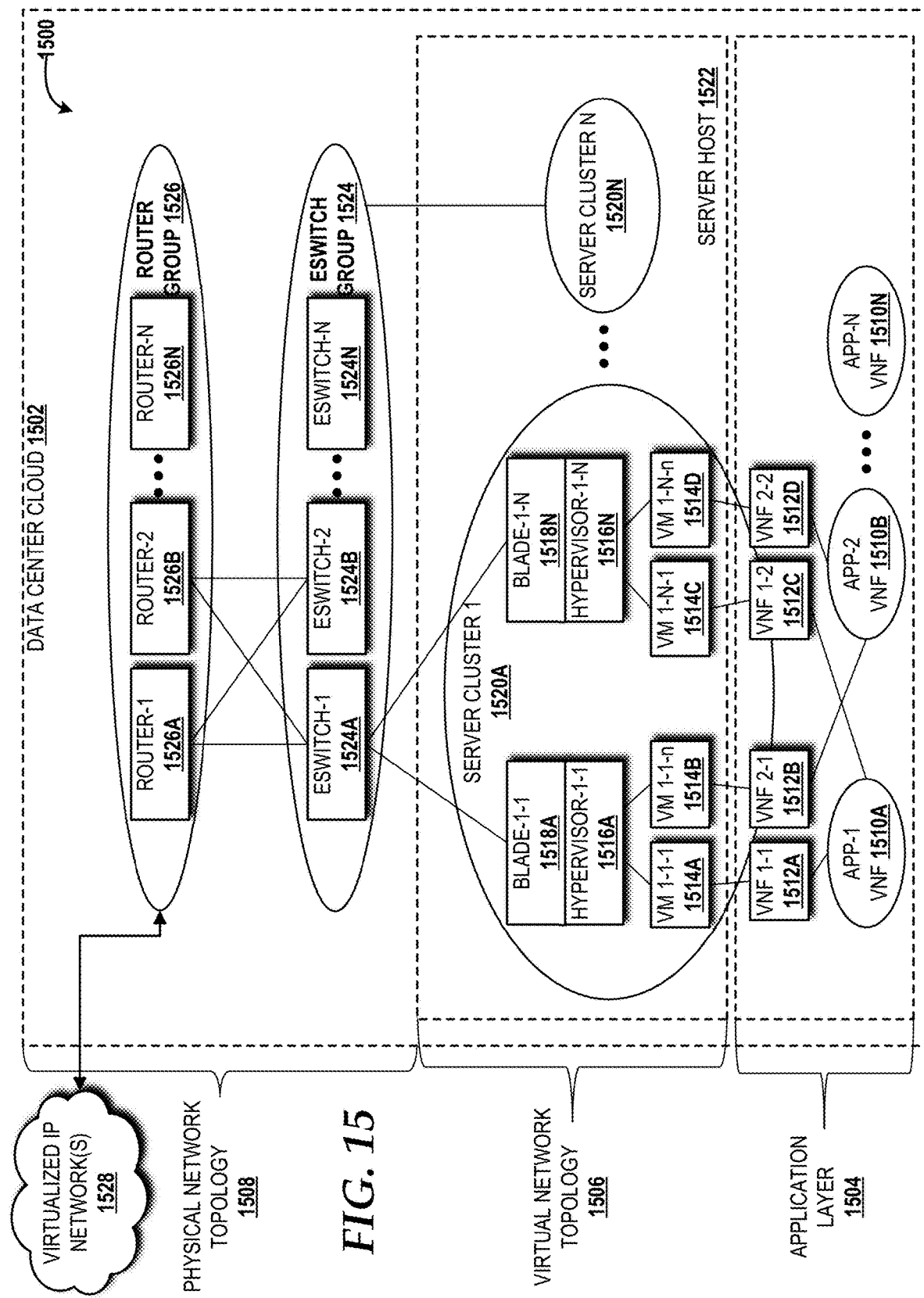
FIG. 15 is a diagram illustrating a network topology for a data center cloud, according to an illustrative embodiment.

Turning now to FIG. 15, a network topology 1500 for a data center cloud 1502 will be described, according to an illustrative embodiment. The illustrated network topology 1500 includes three layers: an application ("APP") layer 1504, a virtual network topology layer 1506, and a physical network topology layer 1508. The APP layer 1504 can include one or more application VNFs 1510A-1510N, each of which can be divided to one or more sub-VNFs 1512 to be executed by one or more VMs 1514.

The virtual network topology layer 1506 includes the VMs 1514, one or more hypervisors 1516, and one or more server modules ("blades") 1518. Each blade 1518 can support one hypervisor 1516 that, in turn, can manage one or more of the VMs 1514. The blades 1518 provide computing capacity to support the VMs 1514 carrying the VNFs 1512. The hypervisors 1516 provide resource management among the VMs 1514 supported thereby. A logical server cluster 1520 is created for resource allocation and reallocation purpose, which includes the blades 1518 in the same server host 1522. Each server host 1522 includes one or more of the server clusters 1520.

The physical network topology layer 1508 includes an Ethernet switch ("ESwitch") group 1524 and a router group 1526. The ESwitch group 1524 provides traffic switching function among the blades 1518. The router group 1526 provides connectivity for traffic routing between the data center cloud 1502 and virtualized IP network(s) 1528. The router group 1526 may or may not provide multiplexing functions, depending upon network design.

The virtual network topology 1506 is dynamic by nature, and as such, the VMs 1514 can be moved among the blades 1518 as needed. The physical network topology 1508 is more static, and as such, no dynamic resource allocation is involved in this layer. Through such a network topology configuration, the association among application VNFs 1510, the VM 1514 supporting the application VNFs 1510, and the blades 1518 that host the VM 1514 can be determined.

In the illustrated example, a first VNF is divided into two sub-VNFs, VNF1-1 1512A and VNF1-2 1512C, which is executed by VM 1-1-1 1514A and VM 1-N-1 1514C, respectively. The VM 1-1-1 1514A is hosted by the blade 1-1 1518A and managed by the hypervisor 1-1 1516A in the server cluster 1 1520 of the server host 1522. Traffic switching between the blade 1-1 1518A and the blade 1-N 1518N is performed via ESwitch-1 1524A. Traffic communications between the ESwitch group 1524 and the virtualized IP network(s) 1528 are performed via the router group 1526. In this example, the VM 1-1-1 1514A can be moved from the blade 1-1 1518A to the blade 1-N 1518N for VM live migration if the blade 1-1 1518A is detected to have difficulty to support the VNF 1-1 1512A performance requirements and the blade 1-N 1518N has sufficient capacity and is available to support the VNF1-1 1512A performance requirements. The virtual network topology 1506 is dynamic by nature due to real-time resource allocation/reallocation capability of cloud SDN. The association of application, VM, and blade host in this example is the VNF1-1 1512A is executed on the VM 1-1-1 1514A hosted by the blade 1-1 1518A in the server cluster 1 1520A.

Based on the foregoing, it should be appreciated that concepts and technologies directed to a high availability and high utilization cloud computing environment for supporting telecommunications services have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory comprising instructions for a conductor service and a valet service that, when executed by the processor, cause the processor to perform operations comprising
      receiving, by the conductor service, from an orchestrator, a virtual network function homing request,
      performing, by the conductor service, a capacity check for each candidate site of a plurality of sites, wherein the plurality of sites are configured in accordance with a local and geo-redundancy model for virtual network function placement within a cloud computing environment, wherein the local and geo-redundancy model for virtual network function placement within the cloud computing environment comprises a cloud utilization value of at least a minimum percentage with a site availability value of at least 99.999% and a virtual machine availability of at least 99.999%, selecting, by the conductor service, a target site having a capacity needed to accommodate the virtual network function homing request, identifying, by the conductor service, the target site to the orchestrator, receiving, by the valet service, from the orchestrator, a virtual network function placement request, wherein the virtual network function placement request identifies the target site and a number of virtual network functions to be instantiated at the target site, determining, by the valet service, placement for the number of virtual network functions within the target site, and notifying, by the valet service, the orchestrator of the placement for the number of virtual network functions within the target site.

2. The system of claim 1, wherein the minimum percentage is 37.5%.

3. The system of claim 1, wherein the minimum percentage is 66%.

4. The system of claim 1, wherein the minimum percentage is 75%.

5. The system of claim 1, wherein the virtual network function placement request comprises an orchestration template.

6. The system of claim 5, wherein the orchestration template comprises an OPENSTACK HOT.

7. The system of claim 1, wherein the plurality of sites configured in accordance with the local and geo-redundancy model for application placement within the cloud computing environment also provides low latency.

8. A method comprising:

receiving, by a conductor service executed by a processor of a central placement decision system, from an orchestrator, a virtual network function homing request;

performing, by the conductor service, a capacity check for each candidate site of a plurality of sites, wherein the plurality of sites are configured in accordance with a local and geo-redundancy model for virtual network function placement within a cloud computing environment, wherein the local and geo-redundancy model for virtual network function placement within the cloud computing environment comprises a cloud utilization value of at least a minimum percentage with a site availability value of at least 99.999% and a virtual machine availability of at least 99.999%;

selecting, by the conductor service, a target site having a capacity needed to accommodate the virtual network function homing request;

identifying, by the conductor service, the target site to the orchestrator;

receiving, by a valet service executed by the processor of the central placement decision system, from the orchestrator, a virtual network function placement request, wherein the virtual network function placement request identifies the target site and a number of virtual network functions to be instantiated at the target site;

determining, by the valet service, placement for the number of virtual network functions within the target site; and notifying, by the valet service, the orchestrator of the placement for the number of virtual network functions within the target site.

9. The method of claim 8, wherein the minimum percentage is 37.5%.

10. The method of claim 8, wherein the minimum percentage is 66%.

11. The method of claim 8, wherein the minimum percentage is 75%.

12. The method of claim 8, wherein the virtual network function placement request comprises an orchestration template.

13. The method of claim 12, wherein the orchestration template comprises an OPENSTACK HOT.

14. The method of claim 8, wherein the plurality of sites configured in accordance with the local and geo-redundancy model for application placement within the cloud computing environment also provides low latency.

15. A computer-readable storage medium comprising instructions for a conductor service and a valet service that, when executed by a processor, cause the processor to perform operations comprising:

receiving, by the conductor service, from an orchestrator, a virtual network function homing request;

performing, by the conductor service, a capacity check for each candidate site of a plurality of sites, wherein the plurality of sites are configured in accordance with a local and geo-redundancy model for virtual network function placement within a cloud computing environment, wherein the local and geo-redundancy model for virtual network function placement within the cloud computing environment comprises a cloud utilization value of at least a minimum percentage with a site availability value of at least 99.999% and a virtual machine availability of at least 99.999%;

selecting, by the conductor service, a target site having a capacity needed to accommodate the virtual network function homing request;

identifying, by the conductor service, the target site to the orchestrator;

receiving, by the valet service, from the orchestrator, a virtual network function placement request, wherein the virtual network function placement request identifies the target site and a number of virtual network functions to be instantiated at the target site;

determining, by the valet service, placement for the number of virtual network functions within the target site; and notifying, by the valet service, the orchestrator of the placement for the number of virtual network functions within the target site.

16. The computer-readable storage medium of claim 15, wherein the minimum percentage is 37.5%.

17. The computer-readable storage medium of claim 15, wherein the minimum percentage is 66%.

18. The computer-readable storage medium of claim 15, wherein the minimum percentage is 75%.

19. The computer-readable storage medium of claim 15, wherein the virtual network function placement request comprises an orchestration template.

20. The computer-readable storage medium of claim 15, wherein the plurality of sites configured in accordance with the local and geo-redundancy model for application placement within the cloud computing environment also provides low latency.

* * * * *